(12) United States Patent
Yoshimura et al.

(10) Patent No.: US 11,974,258 B2
(45) Date of Patent: Apr. 30, 2024

(54) TERMINAL APPARATUS, BASE STATION APPARATUS, AND COMMUNICATION METHOD TO SET VALUE OF FREQUENCY DOMAIN RESOURCE ASSIGNMENT FIELD BASED ON BANDWIDTH OF RESOURCE BLOCKS

(71) Applicant: Sharp Kabushiki Kaisha, Sakai (JP)

(72) Inventors: Tomoki Yoshimura, Sakai (JP); Shoichi Suzuki, Sakai (JP); Toshizo Nogami, Sakai (JP); Wataru Ouchi, Sakai (JP); Taewoo Lee, Sakai (JP); Huifa Lin, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 650 days.

(21) Appl. No.: 17/263,190

(22) PCT Filed: Jul. 29, 2019

(86) PCT No.: PCT/JP2019/029602
§ 371 (c)(1),
(2) Date: Jan. 26, 2021

(87) PCT Pub. No.: WO2020/027027
PCT Pub. Date: Feb. 6, 2020

(65) Prior Publication Data
US 2021/0185679 A1      Jun. 17, 2021

(30) Foreign Application Priority Data
Jul. 31, 2018   (JP) .................. 2018-143407

(51) Int. Cl.
*H04W 72/0453*   (2023.01)
*H04W 72/1273*   (2023.01)
*H04W 72/23*     (2023.01)

(52) U.S. Cl.
CPC ... *H04W 72/0453* (2013.01); *H04W 72/1273* (2013.01); *H04W 72/23* (2023.01)

(58) Field of Classification Search
CPC ................................. H04W 72/0453
See application file for complete search history.

(56) References Cited

U.S. PATENT DOCUMENTS 10,455,582 B1 *  10/2019  Li .................... H04L 5/0044
2019/0223205 A1 *  7/2019  Papasakellariou .... H04L 5/0057
(Continued)

FOREIGN PATENT DOCUMENTS

EP        3602951 A1      2/2020
WO    2019/190374 A1    10/2019

OTHER PUBLICATIONS

NTT Docomo, "New SID Proposal: Study on New Radio Access Technology", 3GPP TSG RAN Meeting #71, RP-160671, Mar. 7-10, 2016, 8 pages.

(Continued)

*Primary Examiner* — Guang W Li
(74) *Attorney, Agent, or Firm* — Keating & Bennett, LLP

(57) ABSTRACT

A terminal apparatus includes a receiver configured to monitor a PDCCH with a DCI format in a control resource set, and receive a PDSCH scheduled by the DCI format, wherein the DCI format includes a frequency domain resource assignment field, in a case that the number of bits of the frequency domain resource assignment field is given at least based on the number $N^{target}_{RB}$ of resource blocks of a first bandwidth, and the frequency domain resource assignment field is applied to the first bandwidth, a value $N_{RIV}$ indicated by the frequency domain resource assignment field is given based on a first method, and in a case that the number of bits of the frequency domain resource assignment field is given at least based on the number $N^{size}_{RB}$ of resource blocks of a second bandwidth, and the frequency domain (Continued)

resource assignment field is applied to the first bandwidth, the value $N_{RIV}$ is given based on a second method.

4 Claims, 8 Drawing Sheets

(56) References Cited

U.S. PATENT DOCUMENTS

| | | | |
|---|---|---|---|
| 2020/0007296 A1* | 1/2020 | Papasakellariou | H04L 5/0053 |
| 2020/0022144 A1* | 1/2020 | Papasakellariou | H04W 72/23 |
| 2021/0250918 A1* | 8/2021 | Liu | H04L 5/0053 |
| 2022/0201772 A1* | 6/2022 | Shin | H04W 72/1268 |

OTHER PUBLICATIONS

CATT, "On PDSCH and PUSCH resource allocation", 3GPP TSG RAN WG1 Meeting 91, R1-1721416, Nov. 27-Dec. 1, 2017, 13 pages.
3rd Generation Partnership Project; Technical Specification Group Radio Access Network; NR; Physical layer procedures for data (Release 15), 3GPP TS 38.214, V15.2.0, Jun. 2018, pp. 1-95.
Ericsson, "Outcome of offline discussion on 7.1.3.1.4 (DCI content)—part II", TSG-RAN WG1 #93, R1-1807738, May 21-25, 2018, 15 pages.

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

| PUCCH format | Length in OFDM symbols $N^{PUCCH}_{symb}$ |
|---|---|
| 0 | 1 - 2 |
| 1 | 4 - 14 |
| 2 | 1 - 2 |
| 3 | 4 - 14 |
| 4 | 4 - 14 |

FIG. 4

TERMINAL APPARATUS, BASE STATION APPARATUS, AND COMMUNICATION METHOD TO SET VALUE OF FREQUENCY DOMAIN RESOURCE ASSIGNMENT FIELD BASED ON BANDWIDTH OF RESOURCE BLOCKS

TECHNICAL FIELD

The present invention relates to a terminal apparatus, a base station apparatus, and a communication method.

This application claims priority based on JP 2018-143407 filed on Jul. 31, 2018, the contents of which are incorporated herein by reference.

BACKGROUND ART

In the $3^{rd}$ Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as user equipment (UE). LTE is a cellular communication system in which multiple areas are deployed in a cell structure, with each of the multiple areas being covered by a base station apparatus. A single base station apparatus may manage multiple serving cells.

3GPP has been studying a next generation standard (New Radio or NR) (NPL 1) to make a proposal for International Mobile Telecommunication (IMT)-2020, a standard for a next-generation mobile communication system, standardized by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7 to 10 Mar. 2016.

SUMMARY OF INVENTION

Technical Problem

One aspect of the present invention provides a terminal apparatus capable of efficiently performing communication, a communication method used for the terminal apparatus, a base station apparatus capable of efficiently performing communication, and a communication method used for the base station apparatus.

Solution to Problem (1) An aspect of the present invention is a terminal apparatus including a receiver configured to monitor a PDCCH with a DCI format in a control resource set, and receive a PDSCH scheduled by the DCI format, wherein the DCI format includes a frequency domain resource assignment field, in a case that the number of bits of the frequency domain resource assignment field is given at least based on the number $N^{target}_{RB}$ of resource blocks of a first bandwidth, and the frequency domain resource assignment field is applied to the first bandwidth, a value $N_{RIV}$ indicated by the frequency domain resource assignment field is given based on a first method, and in a case that the number of bits of the frequency domain resource assignment field is given at least based on the number $N^{size}_{RB}$ of resource blocks of a second bandwidth, and the frequency domain resource assignment field is applied to the first bandwidth, the value $N_{RIV}$ is given based on a second method.

(2) An aspect of the present invention is the terminal apparatus, wherein in the first method, in a case of $L_{RBs}-1 \leq \text{floor}(N^{target}_{RB}/2)$, the $N_{RIV}$ is given by $N_{RIV}=N^{target}_{RB}*(L_{RBs}-1)+RB_{start}$, and in a case of $L_{RBs}-1 \leq \text{floor}(N^{target}_{RB}/2)$, the $N_{RIV}$ is given by $N_{RIV}=N^{target}_{RB}*(N^{target}_{RB}-L_{RBs}+1)+N^{target}_{RB}-1-RB_{start}$, where the floor($N^{target}_{RB}/2$) is a largest integer within a range that does not exceed the $N^{target}_{RB}/2$, the $N^{target}_{RB}$ is the number of resource blocks to which the frequency domain resource assignment field applies, the $RB_{start}$ is an index for a first resource block of resource blocks to which the PDSCH is mapped, and $L_{RBs}$ is the number of the resource blocks to which the PDSCH is mapped, and in the second method, in a case of $L^2_{RBs}-1 \leq \text{floor}(N^{size}_{RB}/2)$, the $N_{RIV}$ is given by $N_{RIV}=N^{size}_{RB} (L^2_{RBs}-1) RB^2_{start}$, and in a case of $L_{RBs}-1>\text{floor}(N^{target}_{RB}/2)$, the $N_{RIV}$ is given by $N_{RIV}=N^{size}_{RB} (N^{size}_{RB}-L^2_{RBs}+1)+N^{size}_{RB}-1-RB^2_{start}$, where the floor($N^{size}_{RB}/2$) is a largest integer within a range that does not exceed the $N^{size}_{RB}/2$, the $RB^2_{start}$ is given by $RB^2_{start}=RB_{start}/K_{RBG}$, and the $L^2_{RBs}$ is given by $L^2_{RBs}=L_{RBs}/K_{RBG}$.

(3) An aspect of the present invention is a base station apparatus including: a transmitter configured to transmit a PDCCH with a DCI format in a control resource set, and transmit a PDSCH scheduled by the DCI format, wherein the DCI format includes a frequency domain resource assignment field, in a case that the number of bits of the frequency domain resource assignment field is given at least based on the number $N^{target}_{RB}$ of resource blocks of a first bandwidth, and the frequency domain resource assignment field is applied to the first bandwidth, a value $N_{RIV}$ indicated by the frequency domain resource assignment field is given based on a first method, and in a case that the number of bits of the frequency domain resource assignment field is given at least based on the number $N^{size}_{RB}$ of resource blocks of a second bandwidth, and the frequency domain resource assignment field is applied to the first bandwidth, the value $N_{RIV}$ is given based on a second method.

(4) An aspect of the invention is the base station apparatus, wherein in the first method, in a case of $L_{RBs}-1 \leq \text{floor}(N^{target}_{RB}/2)$, the $N_{RIV}$ is given by $N_{RIV}=N^{target}_{RB}*(L_{RBs}-1)+RB_{start}$, and in a case of $L_{RBs}-1>\text{floor}(N^{target}_{RB}/2)$, the $N_{RIV}$ is given by $N_{RIV}=N^{target}_{RB}*(N^{target}_{RB}-L_{RBs}-1)+N^{target}_{RB}-1-RB_{start}$, where the floor($N^{target}_{RB}/2$) is a largest integer within a range that does not exceed the $N^{target}_{RB}/2$, the $N^{target}_{RB}$ is the number of resource blocks to which the frequency domain resource assignment field applies, the $RB_{start}$ is an index for a first resource block of resource blocks to which the PDSCH is mapped, and $L_{RBs}$ is the number of the resource blocks to which the PDSCH is mapped, and in the second method, in a case of $L_{RBs}-1 \leq \text{floor}(N^{size}_{RB}/2)$, the $N_{RIV}$ is given by $N_{RIV}=N^{size}_{RB}*(L_{RBs}-1)+RB^2_{start}$, and in a case of $L_{RBs}-1>\text{floor}(N^{target}_{RB}/2)$ the $N_{RIV}$ is given by $N_{RIV}=N^{size}_{RB}*(N^{size}_{RB}-L_{RBs}+1)+N^{size}_{RB}-1-RB^2_{start}$, where the floor($N^{size}_{RB}/2$) is a largest integer within a range that does not exceed the $N^{size}_{RB}/2$, the $RB^2_{start}$ is given by $RB^2_{start}=RB_{start}/K_{RBG}$, and the $L_{RBs}$ is given by $L^2_{RBs}=L_{RBs}/K_{RBG}$.

(5) An aspect of the present invention is a communication method for a terminal apparatus, the communication method including the steps of: monitoring a PDCCH with a DCI format in a control resource set; and receiving a PDSCH scheduled by the DCI format, wherein the DCI format includes a frequency domain resource assignment field, in a case that the number of bits of the frequency domain resource assignment field is given at least based on the number $N^{target}_{RB}$ of resource blocks of a first bandwidth, and the frequency domain resource assignment field is applied to the first bandwidth, a value $N_{RIV}$ indicated by the frequency domain resource assignment field is given based on a first method, and in a case that the number of bits of the frequency domain resource assignment field is given at least based on the number $N^{size}_{RB}$ of resource blocks of a second bandwidth, and the frequency domain resource assignment field is applied to the first bandwidth, the value $N_{RIV}$ is given based on a second method.

(6) An aspect of the invention is the communication method used for a terminal apparatus, wherein in the first method, in a case of $L_{RBs}-1 \leq \text{floor}(N^{target}_{RB}/2)$, the $N_{RIV}$ is given by $N_{RIV}=N^{target}_{RB}*(L_{RBs}-1)+RB_{start}$, and in a case of $L_{RBs}-1>\text{floor}(N^{target}_{RB}/2)$, the $N_{RIV}$ is given by $N_{RIV}=N^{target}_{RB}*(N^{target}_{RB}-L_{RBs}+1)+N^{target}_{RB}-1-RB_{start}$, where the $\text{floor}(N^{target}_{RB}/2)$ is a largest integer within a range that does not exceed the $N^{target}_{RB}/2$, the $N^{target}_{RB}$ is the number of resource blocks to which the frequency domain resource assignment field applies, the $RB_{start}$ is an index for a first resource block of resource blocks to which the PDSCH is mapped, and $L_{RBs}$ is the number of the resource blocks to which the PDSCH is mapped, and in the second method, in a case of $L^2_{RBs}-1 \leq \text{floor}(N^{size}_{RB}/2)$, the $N_{RIV}$ is given by $N_{RIV}=N^{size}_{RB}(L^2_{RBs}-1)+RB^2_{start}$, and in a case of $L_{RBs}-1>\text{floor}(N^{target}_{RB}/2)$, the $N_{RIV}$ is given by $N_{RIV}=N^{size}_{RB}*(N^{size}_{RB}-L^2_{RBs}+1)+N^{size}_{RB}-1-RB^2_{start}$, where the $\text{floor}(N^{size}_{RB}/2)$ is a largest integer within a range that does not exceed the $N^{size}_{RB}/2$, the $RB^2_{start}$ is given by $RB^2_{start}=RB_{start}/K_{RBG}$, and the $L^2_{RBs}$ is given by $L^2_{RBs}=L_{RBs}/K_{RBG}$.

(7) An aspect of the present invention is a communication method used for a base station apparatus, the communication method including the steps of: transmitting a PDCCH with a DCI format in a control resource set; and transmitting a PDSCH scheduled by the DCI format, wherein the DCI format includes a frequency domain resource assignment field, in a case that the number of bits of the frequency domain resource assignment field is given at least based on the number $N^{target}_{RB}$ of resource blocks of a first bandwidth, and the frequency domain resource assignment field is applied to the first bandwidth, a value $N_{RIV}$ indicated by the frequency domain resource assignment field is given based on a first method, and in a case that the number of bits of the frequency domain resource assignment field is given at least based on the number $N^{size}_{RB}$ of resource blocks of a second bandwidth, and the frequency domain resource assignment field is applied to the first bandwidth, the value $N_{RIV}$ is given based on a second method.

(8) An aspect of the invention is the communication method used for a base station apparatus, wherein in the first method, in a case of $L_{RBs}-1 \leq \text{floor}(N^{target}_{RB}/2)$, the $N_{RIV}$ is given by $N_{RIV}=N^{target}_{RB}*(L_{RBs}-1)+RB_{start}$, and in a case of $L_{RBs}-1>\text{floor}(N^{target}_{RB}/2)$, the $N_{RIV}$ is given by $N_{RIV}=N^{target}_{RB}*(N^{target}_{RB}-L_{RBs}+1)+N^{target}_{RB}-1-RB_{start}$, where the $\text{floor}(N^{target}_{RB}/2)$ is a largest integer within a range that does not exceed the $N^{target}_{RB}/2$, the $N^{target}_{RB}$ is the number of resource blocks to which the frequency domain resource assignment field applies, the $RB_{start}$ is an index for a first resource block of resource blocks to which the PDSCH is mapped, and $L_{RBs}$ is the number of the resource blocks to which the PDSCH is mapped, and in the second method, in a case of $L^2_{RBs}-1 \leq \text{floor}(N^{size}_{RB}/2)$, the $N_{RIV}$ is given by $N_{RIV}=N^{size}_{RB}*(L^2_{RBs}-1)+RB^2_{start}$, and in a case of $L_{RBs}-1>\text{floor}(N^{target}_{RB}/2)$, the $N_{RIV}$ is given by $N_{RIV}=N^{size}_{RB}*(N^{size}_{RB}-L^2_{RBs}+1)+N^{size}_{RB}-1-RB^2_{start}$, where the $\text{floor}(N^{size}_{RB}/2)$ is a largest integer within a range that does not exceed the $N^{size}_{RB}/2$, the $RB^2_{start}$ is given by $RB^2_{start}=RB_{start}/K_{RBG}$, and the $L^2_{RBs}$ is given by $L^2_{RBs}=L_{RBs}/K_{RBG}$.

Advantageous Effects of Invention

According to an aspect of the present invention, the terminal apparatus can efficiently perform communication. In addition, the base station apparatus can efficiently perform communication.

BRIEF DESCRIPTION OF DRAWINGS

FIG. 2 is an example illustrating a relationship between $N^{slot}_{symb}$, a subcarrier spacing configuration μ, and a CP configuration according to an aspect of the present embodiment.

FIG. 4 is a diagram illustrating an example of a relationship between a PUCCH format and a length $N^{PUCCH}_{symb}$ of the PUCCH format according to an aspect of the present embodiment.

DESCRIPTION OF EMBODIMENTS

Embodiments of the present invention will be described below.

Figure 1:
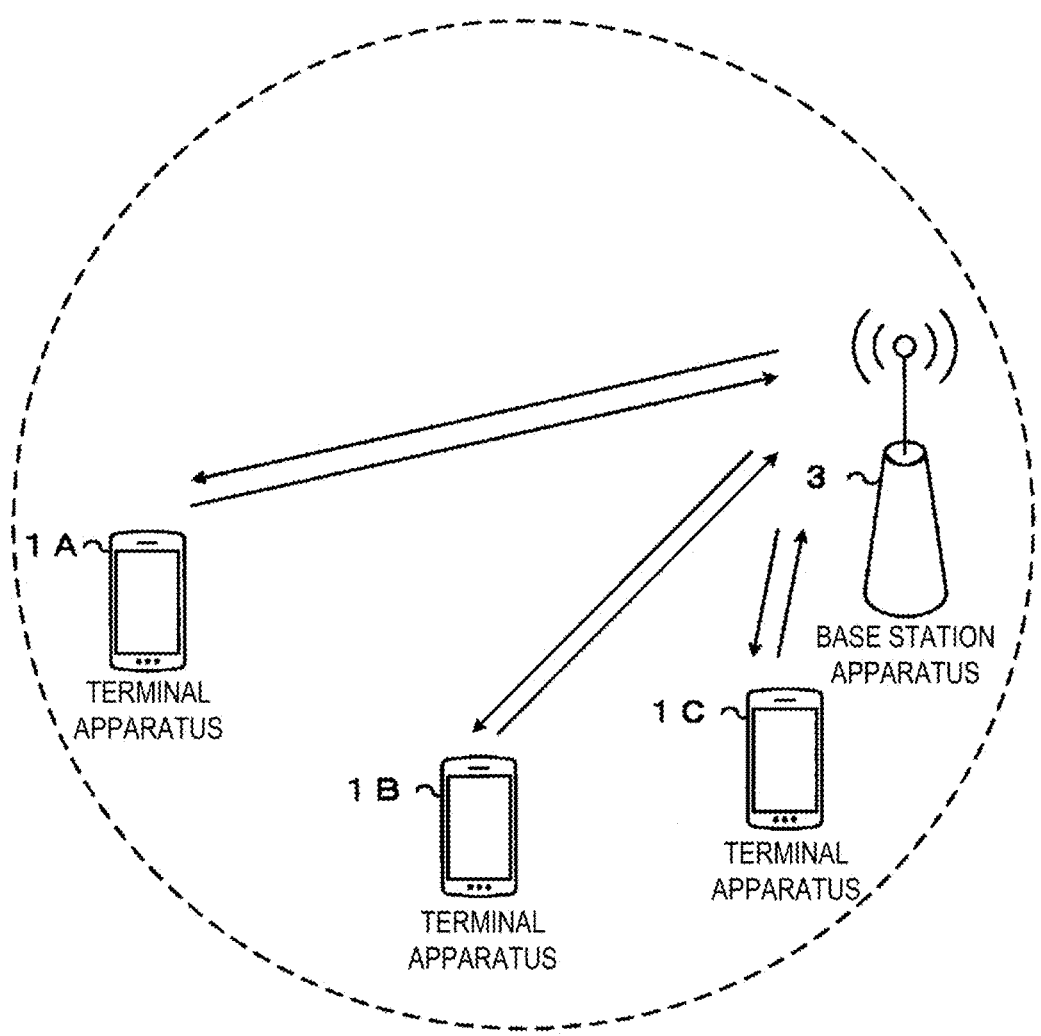
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Hereinafter, the terminal apparatuses 1A to 1C are each also referred to as a terminal apparatus 1.

The base station apparatus 3 may include one or both of a Master Cell Group (MCG) and a Secondary Cell Group (SCG). The MCG is a group of serving cells including at least a Primary Cell (PCell). The SCG is a group of serving cells including at least a Primary Secondary Cell (PSCell). The PCell may be a serving cell provided based on an initial connection. The MCG may include one or multiple Secondary Cells (SCells). The SCG may include one or multiple SCells.

The MCG may include a serving cell on the EUTRA. The SCG may include s serving cell on the next generation standard (New Radio (NR)).

Hereinafter, a frame configuration will be described.

In the radio communication system according to an aspect of the present embodiment, at least Orthogonal Frequency Division Multiplex (OFDM) is used. An OFDM symbol is a unit of a time domain for the OFDM. The OFDM symbol includes at least one or multiple subcarriers. The OFDM symbol is converted into a time-continuous signal in generating a baseband signal. In downlink, at least Cyclic Prefix-Orthogonal Frequency Division Multiplex (CP-OFDM) is used. In uplink, either the CP-OFDM or Discrete Fourier Transform spread-Orthogonal Frequency Division Multiplex (DFTS-s-OFDM) is used. The DFT-s-OFDM may be given by applying Transform precoding to the CP-OFDM.

A SubCarrier Spacing (SCS) may be given by a subcarrier spacing $\Delta f = 2^\mu \cdot 15$ kHz. For example, a subcarrier spacing configuration $\mu$ may be set to any of 0, 1, 2, 3, 4, and/or 5. For a BandWidth Part (BWP), the subcarrier spacing configuration $\mu$ may be given by a higher layer parameter.

In the radio communication system according to an aspect of the present embodiment, a time unit $T_c$ is used for representing a length in the time domain. The time unit $T_c$ may be given as $T_c = 1/(\Delta f_{max} \cdot N_f)$. $\Delta f_{max}$ may be the maximum value of the subcarrier spacing supported by the radio communication system according to an aspect of the present embodiment. $\Delta f_{max}$ may be $\Delta f_{max} = 480$ kHz. $N_f$ may be $N_f = 4096$. A constant $\kappa$ is $\kappa = \Delta f_{max} \cdot N_f/(\Delta f_{ref} N_{f, ref}) = 64$. $\Delta f_{ref}$ may be 15 kHz. $N_{f, ref}$ may be 2048.

The constant $\kappa$ may be a value indicating a relationship between a reference subcarrier spacing and $T_c$. The constant $\kappa$ may be used for a length of a subframe. The number of slots included in the subframe may be given at least based on the constant $\kappa$. $\Delta f_{ref}$ is the reference subcarrier spacing, and $N_{f, ref}$ is a value corresponding to the reference subcarrier spacing.

A signal transmission in the downlink and/or a signal transmission in the uplink includes a frame of 10 ms. A frame is configured to include 10 subframes. A length of the subframe is 1 ms. A length of the frame may be given regardless of the subcarrier spacing $\Delta f$. That is, a frame configuration may be given regardless of $\mu$. The length of the subframe may be given regardless of the subcarrier spacing $\Delta f$. That is, a subframe configuration may be given regardless of $\mu$.

For a subcarrier spacing configuration $\mu$, the number and indices of slots included in a subframe may be given. For example, a slot number $n^\mu_s$, may be given in ascending order ranging from 0 to $N^{subframe, \mu}_{slot} - 1$ in a subframe. For the subcarrier spacing configuration $\mu$, the number and indices of slots included in a frame may be given. Moreover, a slot number $n^\mu_{s, f}$ may be given in ascending order ranging from 0 to $N^{frame, \mu}_{slot} - 1$ within a frame. $N^{slot}_{symb}$ continuous OFDM symbols may be included in one slot. $N^{slot}_{symb}$ may be given at least based on part or all of a Cyclic Prefix (CP) configuration. The CP configuration may be given at least based on a higher layer parameter. The CP configuration may be given at least based on dedicated RRC signaling. The slot number is also referred to as a slot index.

FIG. 2 is an example illustrating a relationship between $N^{slot}_{symb}$, the subcarrier spacing configuration $\mu$, and the CP configuration according to an aspect of the present embodiment. In FIG. 2A, for example, in a case that the subcarrier spacing configuration $\mu$ is 2 and the CP configuration is a normal cyclic prefix (normal CP), $N^{slot}_{symb} = 14$, $N^{frame, \mu}_{slot} = 40$, and $N^{subframe, \mu}_{slot} = 4$. In FIG. 2B, for example, in a case that the subcarrier spacing configuration $\mu$ is 2 and the CP configuration is an extended cyclic prefix (extended CP), $N^{slot}_{symb} = 12$, $N^{frame, \mu}_{slot} = 40$, and $N^{subframe, \mu}_{slot} = 4$.

Physical resources will be described below.

An antenna port is defined in such a manner that a channel on which a symbols on one antenna port is conveyed can be inferred from a channel on which another symbol on the same antenna port is conveyed. In a case that a large scale property of the channel on which the symbol on one antenna port is conveyed can be inferred from the channel on which the symbol on another antenna port is conveyed, the two antenna ports are said to be Quasi Co-Located (QCL). The large scale property may include at least a long term performance of the channel. The large scale property may include at least some or all of delay spread, Doppler spread, Doppler shift, average gain, average delay, and beam parameters (spatial Rx parameters). A first antenna port and a second antenna port being QCL with respect to a beam parameter may mean that a reception beam assumed by the reception side for the first antenna port may be the same as a reception beam assumed by the reception side for the second antenna port. The first antenna port and the second antenna port being QCL with respect to a beam parameter may mean that a transmission beam assumed by the reception side for the first antenna port may be the same as a transmission beam assumed by the reception side for the second antenna port. In a case that the terminal apparatus 1 can estimate the large scale property of the channel on which the symbol on one antenna port is conveyed from the channel on which the symbol on another antenna port is conveyed, the two antenna ports may be assumed to be QCL. Two antenna ports being QCL may mean that the two antenna ports are assumed to be QCL.

For the subcarrier spacing configuration and a set of carriers, a resource grid defined by $N^{size, \mu}_{grid, x} N^{RB}_{sc}$ subcarriers and $N^{subframe, \mu}_{symb}$ OFDM symbols is given. $N^{size, \mu}_{grid, x}$ may indicate the number of resource blocks given for the subcarrier spacing configuration $\mu$ for a carrier x. $N^{size, \mu}_{grid, x}$ may indicate a bandwidth of the carrier. $N^{size, \mu}_{grid, x}$ may correspond to a value of a higher layer parameter CarrierBandwidth. The carrier x may indicate either a downlink carrier or an uplink carrier. In other words, x may be either "DL" or "UL." $N^{RB}_{sc}$ may indicate the number of subcarriers included in one resource block. $N^{RB}_{sc}$ may be 12. At least one resource grid may be provided for each antenna port p and/or for each subcarrier spacing configuration $\mu$ and/or for each Transmission direction configuration. The transmission direction includes at least DownLink (DL) and UpLink (UL). Hereinafter, a set of parameters including at least some or all of the antenna port p, the subcarrier spacing configuration u, and the transmission direction configuration is also referred to as a first radio parameter set. That is, one resource grid may be given for each first radio parameter set.

A carrier included in a serving cell in the downlink is referred to as a downlink carrier (or a downlink component carrier). A carrier included in a serving cell in the uplink is referred to as an uplink carrier (or an uplink component carrier). The downlink component carrier and the uplink component carrier are collectively referred to as a component carrier (o a carrier).

A type of the serving cell may be either the PCell, the PSCell, or the SCell. The PCell may be a serving cell identified at least based on a cell ID acquired from an SS/PBCH in the initial connection. The SCell may be a serving cell used in carrier aggregation. The SCell may be a serving cell given at least based on dedicated RRC signaling.

Each element in the resource grid given for each first radio parameter set is referred to as a resource element. The resource element is identified by an index $k_{sc}$ of a frequency domain and an index $l_{sym}$ of a time domain. For a first radio parameter set, a resource element is identified by an index $k_{sc}$ of the frequency domain and an index $l_{sym}$ of the time domain. The resource element identified by the index $k_{sc}$ of the frequency domain and the index $l_{sym}$ of the time domain is also referred to as a resource element ($k_{sc}$, $l_{sym}$). The index $k_{sc}$ of the frequency domain indicates any value from 0 to $N^{\mu}_{RB}N^{RB}_{sc}-1$. $N^{\mu}_{RB}$ may be the number of resource blocks given for the subcarrier spacing configuration μ. $N^{RB}$ may be $N^{size, \mu}_{grid, x}$. $N^{RB}_{sc}$ is the number of subcarriers included in a resource block, and $N^{RB}_{sc}=12$. The index $k_{sc}$ of the frequency domain may correspond to a subcarrier index $k_{sc}$. The index $l_{sym}$ of the time domain may correspond to an OFDM symbol index $l_{sym}$.

Figure 3:
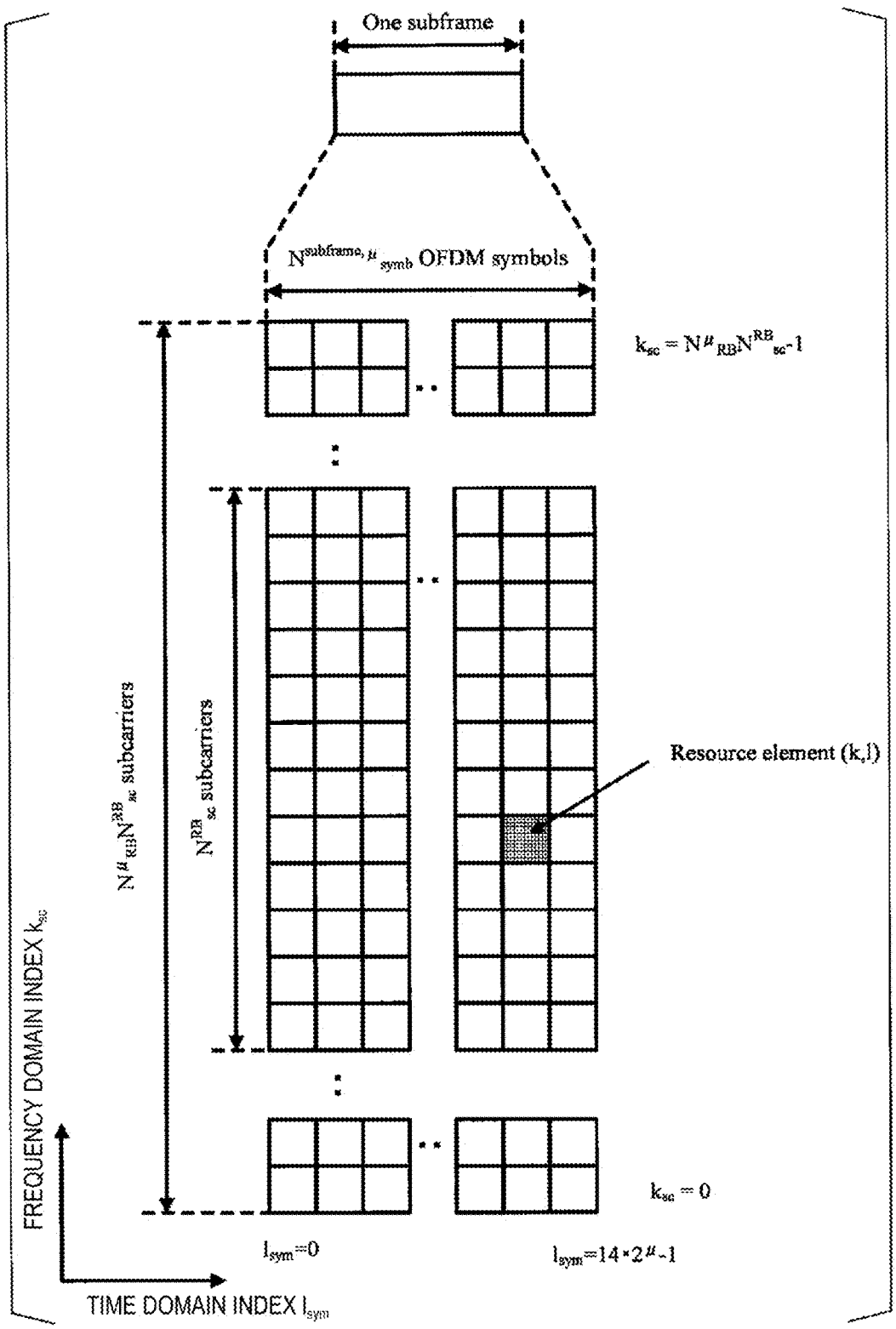
FIG. 3 is a schematic diagram illustrating an example of a resource grid in a subframe according to an aspect of the present embodiment.

FIG. 3 is a schematic diagram illustrating an example of a resource grid in a subframe according to an aspect of the present embodiment. In the resource grid of FIG. 3, a horizontal axis is the index $l_{sym}$ of the time domain and a vertical axis is the index $k_{sc}$ of the frequency domain. In one subframe, the frequency domain of the resource grid includes $N^{\mu}_{RB}N^{RB}_{sc}$ subcarriers. In one subframe, the time domain of the resource grid may include 14*2μ OFDM symbols. One resource block includes $N^{RB}_{sc}$ subcarriers. The time domain of the resource block may correspond to one OFDM symbol. The time domain of the resource block may correspond to 14 OFDM symbols. The time domain of the resource block may correspond to one or multiple slots. The time domain of the resource block may correspond to one subframe.

The terminal apparatus 1 may receive indication to perform transmission and/or reception by using only a subset of the resource grid. The subset of the resource grids is also referred to as a BWP, and the BWP may be given at least based on part or all of higher layer parameters and/or the DCI. The BWP is also referred to as a Carrier BandWidth Part. The terminal apparatus 1 may not receive indication to perform transmission and/or reception by using all sets of resource grids. The terminal apparatus 1 may receive indication to perform transmission and/or reception using some frequency resources in the resource grid. One BWP may include multiple resource blocks in the frequency domain. One BWP may include multiple resource blocks continuous in the frequency domain. The BWP configured for the downlink carrier is also referred to as a downlink BWP. The BWP configured for the uplink carrier is also referred to as an uplink BWP. The BWP may be a subset of the bandwidths of the carrier.

One or multiple downlink BWPs may be configured for each serving cell. One or multiple uplink BWPs may be configured for each serving cell.

One downlink BWP among the one or multiple downlink BWPs configured for the serving cell may be configured in an active downlink BWP. A downlink BWP switch is used to deactivate one active downlink BWP and activate inactive downlink BWPs other than the one active downlink BWP. The downlink BWP switch may be controlled by a BWP field included in downlink control information. The downlink BWP switch may be controlled based on a higher layer parameter.

A DL-SCH may be received in the active downlink BWP. A PDCCH may be monitored in the active downlink BWP. A PDSCH may be received in the active downlink BWP.

The DL-SCH is not received in the inactive downlink BWP. The PDCCH is not be monitored in the inactive downlink BWP. CSI for the inactive downlink BWP is not reported.

Two or more downlink BWPs among one or multiple downlink BWPs configured for the serving cell may not be configured in the active downlink BWP.

One uplink BWP among one or multiple uplink BWPs configured for the serving cell may be configured in the active uplink BWP. An uplink BWP switch is used to deactivate one active uplink BWP and activate inactive uplink BWPs other than the one active uplink BWP. The uplink BWP switch may be controlled by a BWP field included in downlink control information. The uplink BWP switch may be controlled based on a higher layer parameter.

A UL-SCH may be transmitted in the active uplink BWP. A PUCCH may be transmitted in the active uplink BWP. A PRACH may be transmitted in the active uplink BWP. An SRS may be transmitted in the active uplink BWP.

The UL-SCH is not transmitted in the inactive uplink BWP. The PUCCH is not transmitted in the inactive uplink BWP. The PRACH is not transmitted in the inactive uplink BWP. The SRS is not transmitted in the inactive uplink BWP.

Two or more uplink BWPs among one or multiple uplink BWPs configured for the serving cell may not be configured in the active uplink BWP.

A higher layer parameter is a parameter included in higher layer signaling. The higher layer signaling may be a Radio Resource Control (RRC) signaling or a Medium Access Control Control Element (MAC CE). Here, the higher layer signaling may be RRC layer signaling or MAC layer signaling.

The higher layer signaling may be common RRC signaling. The common RRC signaling may include at least some or all of the following features C1 to C3.

Feature C1) Being mapped to a BCCH logical channel or a CCCH logical channel.

Feature C2) Including at least a ReconfigrationWithSync information element.

Feature C3) Being mapped to a PBCH.

The ReconfigrationWithSync information element may include information indicating a configuration commonly used in the serving cell. The configuration commonly used in the serving cell may include at least a PRACH configuration. The PRACH configuration may indicate at least one or multiple random access preamble indexes. The PRACH configuration may indicate at least a time/frequency resource of a PRACH.

The common RRC signaling may include at least a common RRC parameter. The common RRC parameter may be a Cell-specific parameter commonly used in the serving cell.

The higher layer signaling may be dedicated RRC signaling. The dedicated RRC signaling may include at least some or all of the following features D1 and D2.

Feature D1) Being mapped to a DCCH logical channel.

Feature D2) Not including a ReconfigrationWithSync information element.

For example, a Master Information Block (MIB) and a System Information Block (SIB) may be included in the common RRC signaling. In addition, a higher layer message that is mapped to the DCCH logical channel and includes at least the ReconfigrationWithSync information element may be included in the common RRC signaling. In addition, a higher layer message that is mapped to the DCCH logical channel and does not include the ReconfigrationWithSync information element may be included in the dedicated RRC signaling.

The SIB may indicate at least a time index of a Synchronization Signal (SS) block. The SS block is also referred to as an SS/PBCH block. The SIB may include at least information related to a PRACH resource. The SIB may include at least information related to a configuration of the initial connection.

The ReconfigrationWithSync information element may include at least information related to the PRACH resource. The ReconfigrationWithSync information element may include at least information related to the configuration of the initial connection.

The dedicated RRC signaling may include at least a dedicated RRC parameter. The dedicated RRC parameter may be a UE-specific parameter dedicated to the terminal apparatus 1. The dedicated RRC signaling may include at least a common RRC parameter.

The common RRC parameter and the dedicated RRC parameter are also referred to as higher layer parameters.

A physical channel and a physical signal according to various aspects of the present embodiment will be described below.

An uplink physical channel may correspond to a set of resource elements that conveys information generated in a higher layer. The uplink physical channel is a physical channel used in the uplink carrier. In the radio communication system according to an aspect of the present embodiment, at least some or all of the uplink physical channels described below are used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The uplink control information includes part or all of Channel State Information (CSI), a Scheduling Request (SR), and a Hybrid Automatic Repeat request ACKnowledgement (HARQ-ACK) information corresponding to a Transport block (TB) (Medium Access Control Protocol Data Unit (MAC PDU), Downlink-Shared Channel (DL-SCH), Physical Downlink Shared Channel (PDSCH)).

The uplink control information may be multiplexed on the PUCCH. The multiplexed PUCCH may be transmitted.

The HARQ-ACK information may include at least a HARQ-ACK bit corresponding to the transport block. The HARQ-ACK bit may indicate an acknowledgement (ACK) or a negative-acknowledgement (NACK) corresponding to the transport block. The ACK may represent a value indicating that decoding of the transport block has been successfully completed. The NACK may represent a value indicating that decoding of the transport block has not been successfully completed. The HARQ-ACK information may include at least one HARQ-ACK codebook including one or multiple HARQ-ACK bits. The HARQ-ACK bit corresponding to one or multiple transport blocks may be the HARQ-ACK bit corresponding to a PDSCH including the one or multiple transport blocks.

The HARQ-ACK may indicate an ACK or a NACK corresponding to one Code Block Group (CBG) included in the transport block. The HARQ-ACK is also referred to as HARQ feedback, HARQ information, and HARQ control information.

The Scheduling Request (SR) may be used at least to request a PUSCH resource for an initial transmission. A scheduling request bit may be used to indicate either a positive SR or a negative SR. The scheduling request bit indicating the positive SR is also referred to as a "positive SR is transmitted." The positive SR may indicate that the PUSCH resource for the initial transmission is requested by the terminal apparatus 1. The positive SR may indicate that a scheduling request is triggered by a higher layer. The positive SR may be transmitted in case that a scheduling request is indicated to be transmitted by the higher layer. The scheduling request bit indicating the negative SR is also referred to as a "negative SR is transmitted." The negative SR may indicate that the PUSCH resource for the initial transmission is not requested by the terminal apparatus 1. The negative SR may indicate that a scheduling request is not triggered by the higher layer. The negative SR may be transmitted in a case that a scheduling request is not indicated to be transmitted by the higher layer.

The scheduling request bit may be used to indicate either a positive SR or a negative SR for either one or multiple SR configurations. Each of the one or multiple SR configurations may correspond to one or multiple logical channels. A positive SR for a given SR configuration may be a positive SR for any or all of the one or multiple logical channels corresponding to the given SR configuration. The negative SR may not correspond to a particular SR configuration. The negative SR being indicated may be the negative SR being indicated for the all SR configurations.

The SR configuration may be a scheduling request ID. The scheduling request ID may be given by a higher layer parameter.

The channel state information may include at least some or all of a Channel Quality Indicator (CQI), a Precoder Matrix Indicator (PMI) and a Rank Indicator (RI). The CQI is an indicator associated with channel quality (for example, propagation strength), and the PMI is an indicator indicating a precoder. The RI is an indicator indicating a transmission rank (or the number of transmission layers).

The channel state information may be given at least based on receiving a physical signal (e.g., CSI-RS) that is at least used for channel measurement. The channel state information may include a value selected by the terminal apparatus 1. The channel state information may be selected by the terminal apparatus 1 at least based on receiving the physical signal that is at least used for the channel measurement. The channel measurement includes interference measurement.

A channel state information report is a report of the channel state information. The channel state information report may include a CSI part 1 and/or a CSI part 2. The CSI part 1 may include at least some or all of wideband channel quality information (wideband CQI), a wideband precoder matrix indicator (wideband PMI), and a rank indicator. The number of bits of the CSI part 1 multiplexed on the PUCCH may be a prescribed value regardless of a value of the rank indicator of the channel state information report. The number of bits of the CSI part 2 multiplexed on the PUCCH may be given based on the value of the rank indicator of the channel state information report. The rank indicator of the channel state information report may be a value of the rank indicator used to calculate the channel state information report. The rank indicator of the channel state information may be a value indicated by a rank indicator field included in the channel state information report.

A set of rank indicators permitted in the channel state information report may be part or all of 1 to 8. The set of rank indicators permitted in the channel state information report may be given at least based on a higher layer parameter RankRestriction. In a case that the set of rank indicators permitted in the channel state information report includes only one value, the rank indicator of the channel state information report may be the one value.

A priority may be configured for the channel state information report. The priority of the channel state information report may be given at least based on some or all of a configuration related to a time domain behavior of the channel state information report, a type of content of the channel state information report, an index of the channel state information report, and/or an index of a serving cell configured with measurement of the channel state information report.

The configuration related to the time domain behavior of the channel state information report may be a configuration indicating whether the channel state information report is performed aperiodically, semi-persistently, or semi-statically.

The type of content of the channel state information report may indicate whether the channel state information report includes a Reference Signals Received Power (RSRP) of a layer 1.

The index of the channel state information report may be given by a higher layer parameter.

The PUCCH supports PUCCH formats (PUCCH format 0 to PUCCH format 4). The PUCCH format may be transmitted on the PUCCH. The PUCCH format being transmitted may be the PUCCH being transmitted.

FIG. 4 is a diagram illustrating an example of a relationship between a PUCCH format and a length $N^{PUCCH}_{symb}$ of the PUCCH format according to an aspect of the present embodiment. The length $N^{PUCCH}_{symb}$ of PUCCH format 0 is 1 or 2 OFDM symbols. The length $N^{PUCCH}_{symb}$ of PUCCH format 1 is any of 4 to 14 OFDM symbols. The length $N^{PUCCH}_{symb}$ of PUCCH format 2 is 1 or 2 OFDM symbols. The length $N^{PUCCH}_{symb}$ of PUCCH format 3 is any of 4 to 14 OFDM symbols. The length $N^{PUCCH}_{symb}$ of PUCCH format 4 is any of 4 to 14 OFDM symbols.

The PUSCH is used at least to transmit the transport block (TB, MAC PDU, and UL-SCH). The PUSCH may be used to transmit at least some or all of the transport block, the HARQ-ACK information, the channel state information, and the scheduling request. The PUSCH is used at least to transmit a random access message 3.

The PRACH may be used at least to transmit a random access preamble (random access message 1). The PRACH may be used at least to indicate some or all of an initial connection establishment procedure, a handover procedure, a connection re-establishment procedure, synchronization (timing adjustment) for PUSCH transmission, and a request for the PUSCH resource. The random access preamble may be used to notify the base station apparatus 3 of an index (random access preamble index) given by a higher layer of the terminal apparatus 1.

The random access preamble may be given by cyclic-shifting a Zadoff-Chu sequence corresponding to a physical root sequence index u. The Zadoff-Chu sequence may be generated based on the physical root sequence index u. In one serving cell, multiple random access preambles may be defined. A random access preamble may be identified at least based on an index of the random access preamble. A different random access preamble corresponding to a different index of the random access preamble may correspond to a different combination of the physical root sequence index u and the cyclic shift. The physical root sequence index u and the cyclic shift may be given at least based on information included in system information. The physical root sequence index u may be an index for identifying a sequence included in the random access preamble. The random access preamble may be identified at least based on the physical root sequence index u.

In FIG. 1, the following uplink physical signals are used for uplink radio communication. The uplink physical signals may not be used to transmit information output from a higher layer, but is used by a physical layer.

UpLink Demodulation Reference Signal (UL DMRS)
Sounding Reference Signal (SRS)
UpLink Phase Tracking Reference Signal (UL PTRS)

The UL DMRS is associated with transmission of a PUSCH and/or a PUCCH. The UL DMRS is multiplexed on the PUSCH or the PUCCH. The base station apparatus 3 may use the UL DMRS in order to perform channel compensation of the PUSCH or the PUCCH. Transmission of both a PUSCH and a UL DMRS associated with the PUSCH will be hereinafter referred to simply as transmission of a PUSCH. Transmission of both a PUCCH and a UL DMRS associated with the PUCCH will be hereinafter referred to simply as transmission of a PUCCH. The UL DMRS associated with the PUSCH is also referred to as a UL DMRS for a PUSCH. The UL DMRS associated with the PUCCH is also referred to as a UL DMRS for a PUCCH.

The SRS may not be associated with transmission of the PUSCH or the PUCCH. The base station apparatus 3 may use the SRS for measuring a channel state. The SRS may be transmitted at the end of a subframe in an uplink slot or in a prescribed number of OFDM symbols from the end.

The UL PTRS may be a reference signal that is at least used for phase tracking. The UL PTRS may be associated with a UL DMRS group including at least an antenna port used for one or multiple UL DMRSs. The association of the UL PTRS with UL DMRS group may mean that the antenna port for the UL PTRS and some or all of the antenna ports included in the UL DMRS group are at least QCL. The UL DMRS group may be identified at least based on the antenna port of the lowest index for the UL DMRS included in the UL DMRS group. The UL PTRS may be mapped to the lowest index antenna port of one or multiple antenna ports to which one codeword is mapped. In a case that one codeword is mapped to at least a first layer and a second layer, the UL PTRS may be mapped to the first layer. The UL PTRS may not be mapped to the second layer. The index of the antenna port to which the UL PTRS is mapped may be given at least based on the downlink control information.

In FIG. 1, the following downlink physical channels are used for downlink radio communication from the base station apparatus 3 to the terminal apparatus 1. The downlink physical channels are used by the physical layer for transmission of information output from a higher layer.

Physical Broadcast Channel (PBCH)
Physical Downlink Control Channel (PDCCH)
Physical Downlink Shared Channel (PDSCH)

The PBCH is used at least to transmit the MIB and/or a PBCH payload. The PBCH payload may include at least information indicating an index related to a transmission timing of the SS block. The PBCH payload may include information related to on an identifier (index) of the SS block. The PBCH may be transmitted at a prescribed transmission interval. The PBCH may be transmitted at an interval of 80 ms. The PBCH may be transmitted at an interval of 160 ms. Contents of information included in the PBCH may be updated at every 80 ms. Some or all of the contents of the information included in the PBCH may be updated at every 160 ms. The PBCH may include 288 subcarriers. The PBCH may include 2, 3, or 4 OFDM symbols. The MIB may include information related to an identifier (index) of the SS block. The MIB may include information indicating at least some of a slot number, a subframe number, and/or a radio frame number in which the PBCH is transmitted.

The PDCCH is used at least to transmit the Downlink Control Information (DCI). The PDCCH may be transmitted including at least the downlink control information. The PDCCH may be transmitted including the downlink control information. The downlink control information is also called a DCI format. The downlink control information may indicate at least either a downlink grant or an uplink grant. The DCI format used for scheduling of the PDSCH is also referred to as a downlink DCI format. The DCI format used for scheduling of the PUSCH is also referred to as an uplink DCI format. The downlink grant is also referred to as downlink assignment or downlink allocation. The uplink DCI format includes at least one or both of DCI format 0_0 and DCI format 0_1.

DCI format 0_0 includes at least some or all of 1A to 1F.
1A) DCI format identification field (Identifier for DCI format field)
1B) Frequency domain resource allocation field (Frequency domain resource assignment field)
1C) Time domain resource allocation field (Time domain resource assignment field)
1D) Frequency hopping flag field
1E) MCS field (Modulation and Coding Scheme field (MCS field))
1F) First CSI request field The DCI format identification field may be used at least to indicate whether a DCI format including the DCI format identification field corresponds to any of one or multiple DCI formats. The one or multiple DCI formats may be given at least based on some or all of DCI format 1_0, DCI format 1_1, DCI format 0_0, and/or DCI format 0_1.

The frequency domain resource assignment field may be used at least to indicate frequency resource allocation for the PUSCH scheduled in the DCI format including the frequency domain resource assignment field.

The time domain resource assignment field may be used at least to indicate time resource allocation for the PUSCH scheduled in the DCI format including the time domain resource assignment field.

The frequency hopping flag field may be used at least to indicate whether or not the frequency hopping is applied to the PUSCH scheduled in the DCI format including the frequency hopping flag field.

The MCS field may be used at least to indicate some or all of a modulation scheme and/or target coding rate for the PUSCH scheduled in the DCI format including the MCS field. The target coding rate may be a target coding rate for the transport block of the PUSCH. A size of the transport block (Transport Block Size (TBS)) may be given at least based on the target coding rate.

A first CSI request field is used at least to indicate the CSI report. A size of the first CSI request field may be a prescribed value. The size of the first CSI request field may be 0, 1, 2, or 3.

DCI format 0_1 includes at least some or all of 2A to 2G.
2A) DCI format identification field
2B) Frequency domain resource assignment field
2C) Time domain resource assignment field
2D) Frequency hopping flag field
2E) MCS field
2F) Second CSI request field
2G) BWP field The BWP field may be used to indicate the uplink BWP to which the PUSCH scheduled in DCI format 0_1 is mapped.

The second CSI request field is used at least to indicate the CSI report. A size of the second CSI request field may be given at least based on a higher layer parameter ReportTriggerSize.

The downlink DCI format includes at least one or both of DCI format 1_0 and DCI format 1_1.

DCI format 1_0 includes at least some or all of 3A to 3H.
3A) DCI format identification field (Identifier for DCI format field)
3B) Frequency domain resource allocation field (Frequency domain resource assignment field)
3C) Time domain resource allocation field (Time domain resource assignment field)
3D) Frequency hopping flag field
3E) MCS field (Modulation and Coding Scheme field (MCS field))
3F) First CSI request field
3G) Timing Indicator Field from PDSCH to HARQ feedback (PDSCH to HARQ feedback timing indicator field)
3H) PUCCH resource indicator field The timing indicator field from PDSCH to HARQ feedback may be a field indicating a timing K1. In a case that the index of the slot including the last OFDM symbol of the PDSCH is a slot n, an index of the slot including the PUCCH or PUSCH including at least the HARQ-ACK corresponding to the transport block included in the PDSCH may be n+K1. In a case that the index of the slot including the last OFDM symbol of the PDSCH is a slot n, an index of the slot including an OFDM symbol at the beginning of the PUCCH or an OFDM symbol at the beginning of the PUSCH including at least the HARQ-ACK corresponding to the transport block included in the PDSCH may be n+K1.

The PUCCH resource indicator field may be a field indicating an index of one or multiple PUCCH resources included in a PUCCH resource set.

DCI format 1_1 includes at least some or all of 4A to 4J.
4A) DCI format identification field (Identifier for DCI format field)
4B) Frequency domain resource allocation field (Frequency domain resource assignment field)
4C) Time domain resource allocation field (Time domain resource assignment field)
4D) Frequency hopping flag field
4E) MCS field (Modulation and Coding Scheme field (MCS field))
4F) First CSI request field
4G) Timing Indicator Field from PDSCH to HARQ feedback (PDSCH to HARQ feedback timing indicator field)
4H) PUCCH resource indicator field
4J) BWP field The BWP field may be used to indicate the downlink BWP to which the PDSCH scheduled in DCI format 1_1 is mapped.

DCI format 2 may include parameters used for transmission power control of the PUSCH or the PUCCH.

In various aspects of the present embodiment, unless otherwise specified, the number of resource blocks indicates the number of resource blocks in the frequency domain.

A single physical channel may be mapped to a single serving cell. A single physical channel may be mapped to a single carrier bandwidth part configured for a single carrier included in a single serving cell.

The terminal apparatus 1 is provided with one or multiple COntrol REsource SETs (CORESETs). The terminal apparatus 1 monitors the PDCCH in one or multiple control resource sets.

The control resource set may indicate a time-frequency domain to which one or multiple PDCCHs can be mapped. The control resource set may be a domain in which the terminal apparatus 1 monitors the PDCCH. The control resource set may include continuous resources (Localized resources). The control resource set may include non-continuous resources (distributed resources).

In the frequency domain, the unit of mapping the control resource set may use a resource block. In the frequency domain, for example, the unit of mapping the control resource set may be six resource blocks. In the time domain, the unit of mapping the control resource set may use an OFDM symbol. In the time domain, for example, the unit of mapping the control resource set may be one OFDM symbol.

The frequency domain of the control resource sets may be given at least based on higher layer signaling and/or downlink control information.

The time domain of the control resource sets may be given at least based on higher layer signaling and/or downlink control information.

A certain control resource set may be a Common control resource set. The common control resource set may be a control resource set configured commonly to multiple terminal apparatuses 1. The common control resource set may be given at least based on some or all of the MIB, the SIB, the common RRC signaling, and the cell ID. For example, the time resource and/or the frequency resource of the control resource set configured to monitor the PDCCH to be used for scheduling of the SIB may be given at least based on the MIB.

A certain control resource set may be a Dedicated control resource set. The dedicated control resource set may be a control resource set configured to be used exclusively for the terminal apparatus 1. The dedicated control resource set may be given at least based on the dedicated RRC signaling.

A set of PDCCH candidates monitored by the terminal apparatus 1 may be defined from the perspective of a search space. In other words, the set of PDCCH candidates monitored by the terminal apparatus 1 may be given by the search space.

The search space may include one or multiple PDCCH candidates of one or multiple Aggregation levels. The aggregation level for the PDCCH candidate may indicate the number of CCEs comprising the PDCCH.

The terminal apparatus 1 may monitor at least one or multiple search spaces in the slot for which Discontinuous reception (DRX) is not configured. The DRX may be given at least based on a higher layer parameter. The terminal apparatus 1 may monitor at least one or multiple Search space sets in the slot for which the DRX is not configured.

The search space set may include at least one or multiple search spaces. The search space set may be any one of a type 0 PDCCH common search space, a type 0a PDCCH common search space, a type 1 PDCCH common search space, a type 2 PDCCH common search space, a type 3 PDCCH common search space, and/or a UE-specific PDCCH search space.

The type 0 PDCCH common search space, the type 0a PDCCH common search space, the type 1 PDCCH common search space, the type 2 PDCCH common search space, and the type 3 PDCCH common search space are also referred to as a Common Search Space (CSS). The UE-specific PDCCH search space is also referred to as a UE-specific Search Space (USS).

Each search space set may be associated with a single control resource set. Each search space set may be at least included in a single control resource set. Each search space set may be given an index of the control resource set associated with the search space set.

The type 0 PDCCH common search space may be used at least for the DCI format having a Cyclic Redundancy Check (CRC) sequence scrambled with a System Information-Radio Network Temporary Identifier (SI-RNTI). A configuration of the type 0 PDCCH common search space may be given at least based on four bits of Least Significant Bits (LSB) in a higher layer parameter PDCCH-ConfigSIB1. The higher layer parameter PDCCH-ConfigSIB1 may be included in the MIB. The configuration of the type 0 PDCCH common search space may be given at least based on a higher layer parameter SearchSpaceZero. The interpretation of bits in the higher layer parameter SearchSpaceZero may be similar to the interpretation of four bits of the LSB in the higher layer parameter PDCCH-ConfigSIB1. The configuration of the type 0 PDCCH common search space may be given at least based on a higher layer parameter SearchSpaceSIB1. The higher layer parameter SearchSpaceSIB1 may be included in a higher layer parameter PDCCH-ConfigCommon. The PDCCH detected in the type 0 PDCCH common search space may be use at least for scheduling of the PDSCH to be transmitted including an SIB1. The SIB1 is a type of the SIB. The SIB1 may include scheduling information for the SIB other than the SIB1. The terminal apparatus 1 may receive the higher layer parameter PDCCH-ConfigCommon in the EUTRA. The terminal apparatus 1 may receive the higher layer parameter PDCCH-ConfigCommon in the MCG.

The type 0a PDCCH common search space may be used at least for the DCI format having a Cyclic Redundancy Check (CRC) sequence scrambled with a System Information-Radio Network Temporary Identifier (SI-RNTI). The configuration of the type 0a PDCCH common search space may be given at least based on a higher layer parameter SearchSpaceOtherSystemInformation. The higher layer parameter SearchSpaceOtherSystemInformation may be included in the SIB1. The higher layer parameter SearchSpaceOtherSystemInformation may be included in the higher layer parameter PDCCH-ConfigCommon. The PDCCH detected in the type 0 PDCCH common search space may be use at least for scheduling of the PDSCH to be transmitted including an SIB other than the SIB1.

The type 1 PDCCH common search space may be used at least for the DCI format having a CRC sequence scrambled with a Random Access-Radio Network Temporary Identifier (RA-RNTI) and/or a CRC sequence scrambled with a Temporary Common-Radio Network Temporary Identifier (TC-RNTI). The RA-RNTI may be given at least based on a time/frequency resource of the random access preamble transmitted by the terminal apparatus 1. The TC-RNTI may be given by a PDSCH that is scheduled in the DCI format having the CRC sequence scrambled with the RA-RNTI (also referred to as a message 2 or a random access response grant). A configuration of the type 1 PDCCH common search space may be given at least based on a higher layer parameter ra-SearchSpace. The higher layer parameter ra-SearchSpace may be included in the SIB1. The higher layer parameter ra-SearchSpace may be included in the higher layer parameter PDCCH-ConfigCommon.

The type 2 PDCCH common search space may be used at least for the DCI format having a CRC sequence scrambled with a Paging-Radio Network Temporary Identifier (P-RNTI). The P-RNTI may be used at least to transmit the DCI format including information notifying an SIB change. A configuration of the type 2 PDCCH common search space may be given at least based on a higher layer parameter PagingSearchSpace. The higher layer parameter PagingSearchSpace may be included in the SIB1. The higher layer parameter PagingSearchSpace may be included in the higher layer parameter PDCCH-ConfigCommon.

The type 3 PDCCH common search space may be used at least for the DCI format having a CRC sequence scrambled with a Cell-Radio Network Temporary Identifier (C-RNTI). The C-RNTI may be given at least based on a PDSCH that is scheduled in the DCI format having the CRC sequence scrambled with the TC-RNTI (also referred to as a message 4 or a contention resolution). The type 3 PDCCH common search space may be a search space set that is given in a case that a higher layer parameter SearchSpaceType is set in common.

The UE-specific PDCCH search space may be used at least for the DCI format having the CRC sequence scrambled with the C-RNTI.

In a case that the C-RNTI is provided to the terminal apparatus 1, the type 0 PDCCH common search space, the type 0a PDCCH common search space, the type 1 PDCCH common search space, and/or the type 2 PDCCH common search space may be at least used for the DCI format having the CRC sequence scrambled with the C-RNTI.

In the case that the C-RNTI is provided to the terminal apparatus 1, the search space set that is given at least based on any one of the higher layer parameter PDCCH-ConfigSIB1, the higher layer parameter SearchSpaceZero, the higher layer parameter SearchSpaceSIB1, the higher layer parameter SearchSpaceOtherSystemInformation, the higher layer parameter ra-SearchSpace or the higher layer parameter PagingSearchSpace may be used at least for the DCI format having the CRC sequence scrambled with the C-RNTI.

The common control resource set may include at least one or both of the CSS and the USS. The dedicated control resource set may include at least one or both of the CSS and the USS.

A physical resource of the search space includes a Control Channel Element (CCE) of the control channel. The CCE includes six resource element groups (REGs). The REG may include one OFDM symbol in one Physical Resource Block (PRB). In other words, the REG may include 12 Resource Elements (REs). The PRB is also simply referred to as a Resource Block (RB).

The PDSCH is used at least to transmit the transport block. The PDSCH may be used at least to transmit a random access message 2 (random access response). The PDSCH may be used at least to transmit system information including parameters used for an initial access.

In FIG. 1, the following downlink physical signals are used for the downlink radio communication. The downlink physical signals may not be used for transmitting information output from a higher layer, but is used by the physical layer.

Synchronization Signal (SS)
DownLink DeModulation Reference Signal (DL DMRS)
Channel State Information-Reference Signal (CSI-RS)
DownLink Phrase Tracking Reference Signal (DL PTRS)
Tracking Reference Signal (TRS)

The synchronization signal is used for the terminal apparatus 1 to establish synchronization in a frequency domain and/or a time domain in the downlink. The synchronization signal includes a Primary Synchronization Signal (PSS) and a Secondary Synchronization Signal (SSS).

An SS block (SS/PBCH block) is configured to include at least some or all of the PSS, the SSS, and the PBCH. Respective antenna ports of some or all of the PSS, SSS, and PBCH included in the SS block may be the same. Some or all of the PSS, SSS, and PBCH included in the SS block may be mapped to continuous OFDM symbols. Respective CP configurations of some or all of the PSS, SSS, and PBCH included in the SS block may be the same. Respective subcarrier spacing configurations μ of some or all of the PSS, SSS, and PBCH included in the SS block may be the same.

The DL DMRS is associated with transmission of the PBCH, PDCCH and/or PDSCH. The DL DMRS is multiplexed on the PBCH, PDCCH and/or PDSCH. The terminal apparatuses 1 may use the DL DMRS corresponding to the PBCH, PDCCH, or PDSCH in order to perform channel compensation of the PBCH, PDCCH or PDSCH. Hereinafter, transmission of both of the PBCH and the DL DMRS associated with the PBCH is referred to as transmission of the PBCH. Transmission of both of the PDCCH and the DL DMRS associated with the PDCCH is simply referred to as transmission of the PDCCH. Transmission of both of the PDSCH and the DL DMRS associated with the PDSCH is simply referred to as transmission of the PDSCH. The DL DMRS associated with the PBCH is also referred to as a DL DMRS for the PBCH. The DL DMRS associated with the PDSCH is also referred to as a DL DMRS for the PDSCH. The DL DMRS associated with the PDCCH is also referred to as a DL DMRS associated with the PDCCH.

The DL DMRS may be a reference signal individually configured for the terminal apparatus 1. The sequence of the DL DMRS may be given at least based on a parameter individually configured for the terminal apparatus 1. The sequence of the DL DMRS may be given at least based on a UE specific value (e.g., C-RNTI, or the like). The DL DMRS may be individually transmitted for the PDCCH and/or the PDSCH.

The CSI-RS may be a signal used at least to the calculate channel state information. A pattern of the CSI-RS assumed by the terminal apparatus may be given by at least a higher layer parameter.

The PTRS may be a signal to be used at least to compensate for phase noise. A pattern of the PTRS assumed by the terminal apparatus may be given at least based on a higher layer parameter and/or DCI.

The DL PTRS may be associated with a DL DMRS group that includes at least an antenna port used for one or multiple DL DMRSs. The association of the DL PTRS with the DL DMRS group may mean that the antenna port for the DL PTRS and some or all of the antenna ports included in the DL DMRS group are at least QCL. The DL DMRS group may be identified at least based on the antenna port of the lowest index of antenna ports for the DL DMRS included in the DL DMRS group.

The TRS may be a signal to be at least used for time and/or frequency synchronization. A pattern of the TRS assumed by the terminal apparatus may be given at least based on a higher layer parameter and/or DCI.

Downlink physical channels and downlink physical signals are collectively referred to as downlink signals. Uplink physical channels and uplink physical signals are collectively referred to as uplink signals. The downlink signals and the uplink signals are collectively referred to as physical signals. The downlink signal and the uplink signal are collectively referred to as signals. The downlink physical channels and the uplink physical channels are collectively referred to as physical channels. The downlink physical signals and the uplink physical signals are collectively referred to as physical signals.

The Broadcast CHannel (BCH), the Uplink Shared CHannel (UL-SCH) and the Downlink-Shared CHannel (DL-SCH) are transport channels. A channel used in a Medium Access Control (MAC) layer is referred to as a transport channel. A unit of the transport channel used in the MAC layer is also referred to as a transport block (TB) or an MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 exchange (transmit and/or receive) higher layer signaling in the higher layer. For example, the base station apparatus 3 and the terminal apparatus 1 may transmit and/or receive Radio Resource Control (RRC) signaling (Radio Resource Control (RRC) message or Radio Resource Control (RRC) information) in an RRC layer. Furthermore, the base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH are used at least to transmit the RRC signaling and/or the MAC CE. Here, the RRC signaling transmitted from the base station apparatus 3 through the PDSCH may be signaling common to multiple terminal apparatuses 1 in a serving cell. The signaling common to the multiple terminal apparatuses 1 in the serving cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A serving cell-specific higher layer parameter may be transmitted by using the signaling common to the multiple terminal apparatuses 1 in the serving cell or the signaling dedicated to a certain terminal apparatus 1. A UE-specific higher layer parameter may be transmitted by using the signaling dedicated to the certain terminal apparatus 1.

A Broadcast Control CHannel (BCCH), a Common Control CHannel (CCCH), and a Dedicated Control CHannel (DCCH) are logical channels. For example, the BCCH is a higher layer channel used to transmit the MIB. Furthermore, the Common Control CHannel (CCCH) is a higher layer channel used to transmit information common to the multiple terminal apparatuses 1. Here, the CCCH may be used for a terminal apparatus 1 that is not in an RRC connected state, for example. Furthermore, the Dedicated Control CHannel (DCCH) is a higher layer channel used at least to transmit control information dedicated to the terminal apparatus 1 (dedicated control information). Here, the DCCH may be used for a terminal apparatus 1 that is in an RRC connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

A configuration example of the terminal apparatus 1 according to an aspect of the present embodiment will be described below.

Figure 5:
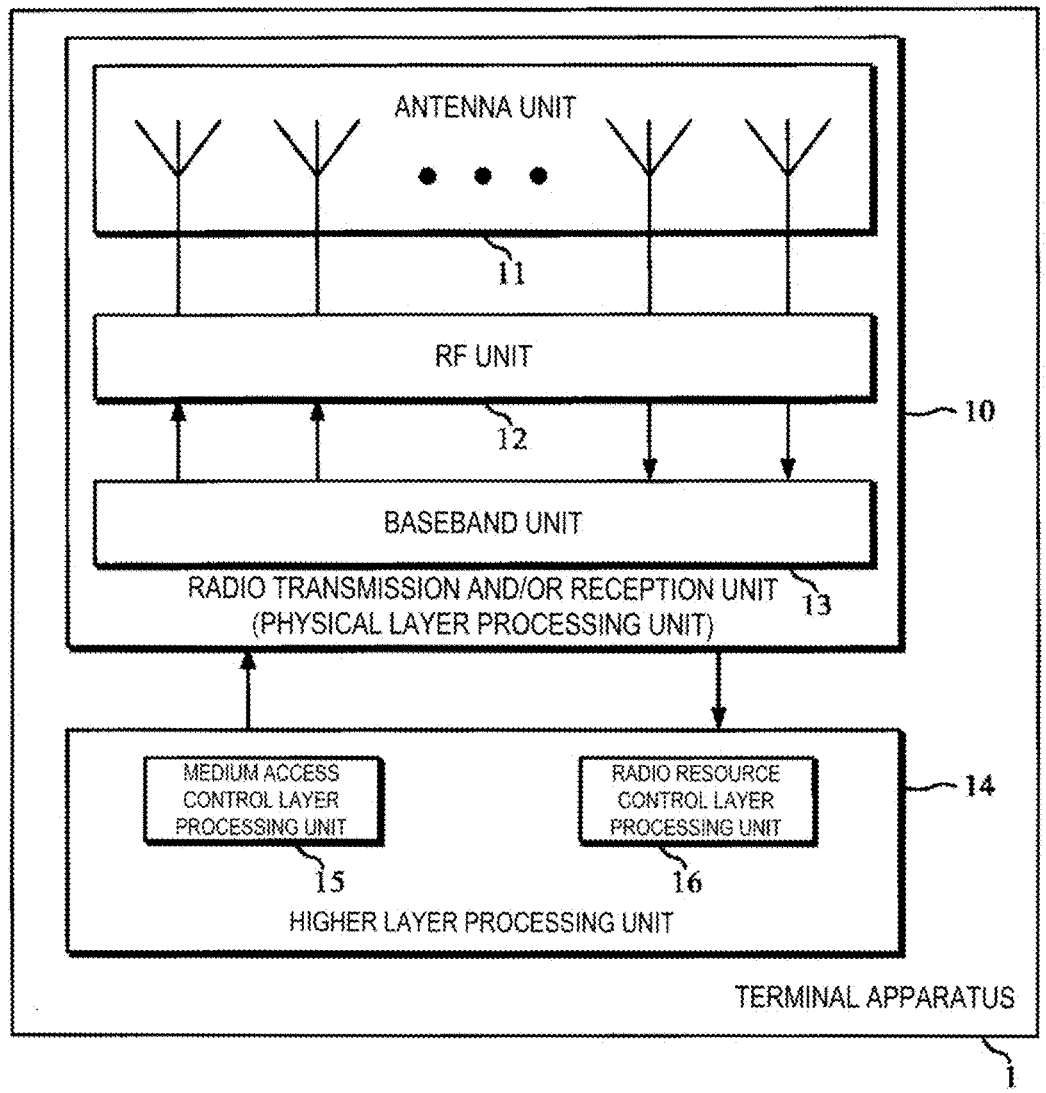
FIG. 5 is a schematic block diagram illustrating a configuration of a terminal apparatus 1 according to an aspect the present embodiment.

FIG. 5 is a schematic block diagram illustrating a configuration of the terminal apparatus 1 according to an aspect the present embodiment. As illustrated, the terminal apparatus 1 is configured to include a radio transmission and/or reception unit 10 and a higher layer processing unit 14. The radio transmission and/or reception unit 10 is configured to include at least some or all of an antenna unit 11, a Radio Frequency (RF) unit 12, and a baseband unit 13. The higher layer processing unit 14 is configured to include at least some or all of a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of an MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various configuration information/parameters in accordance with the information for indicating the various configuration information/parameters received from the base station apparatus 3. The parameters may be higher layer parameters.

The radio transmission and/or reception unit 10 performs processing of the physical layer, such as modulation, demodulation, coding, decoding, and the like. The radio transmission and/or reception unit 10 demultiplexes, demodulates, and decodes a received physical signal and outputs the decoded information to the higher layer processing unit 14. The radio transmission and/or reception unit 10 generates a physical signal by performing modulation and coding of data, and generating a baseband signal (conversion into a time continuous signal), and transmits the physical signal to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

A configuration example of the base station apparatus 3 according to an aspect of the present embodiment will be described below.

Figure 6:
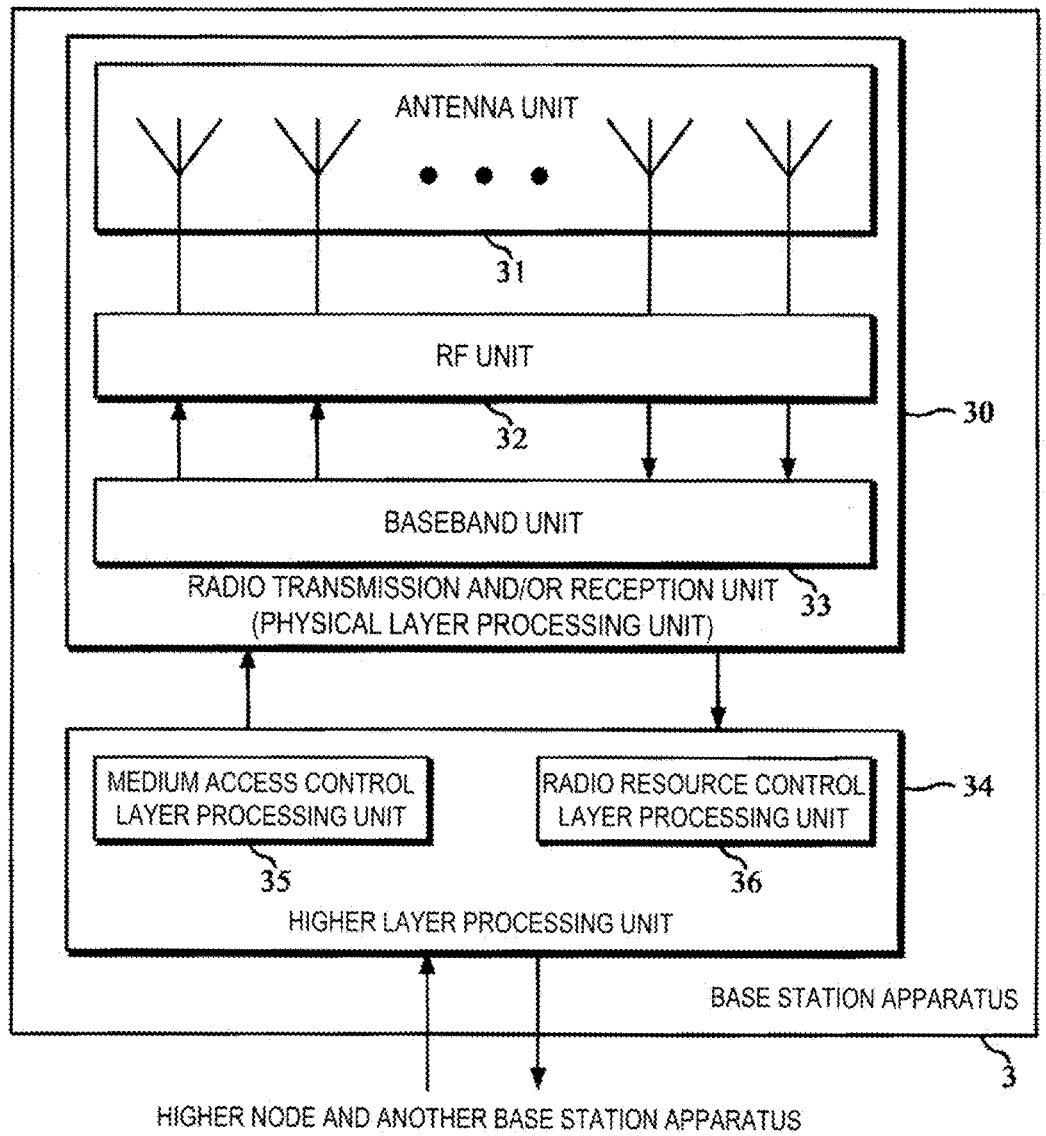
FIG. 6 is a schematic block diagram illustrating a configuration of a base station apparatus 3 according to an aspect of the present embodiment.

FIG. 6 is a schematic block diagram illustrating a configuration of the base station apparatus 3 according to an aspect of the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of a MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on a PDSCH, system information, an RRC message, an MAC CE, and the like, and outputs the data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit. Some or all of the units having the reference signs 10 to 16 included in the terminal apparatus 1 may be configured as a memory and a processor connected to the memory. Some or all of the units having the reference signs 30 to 36 included in the base station apparatus 3 may be configured as a memory and a processor connected to the memory. Various aspects (operations and processes) according to the present embodiment may be implemented (performed) in the memories and the processors connected to the memories included in the terminal apparatus 1 and/or the base station apparatus 3.

Examples of the various aspects will be described below.

Figure 7:
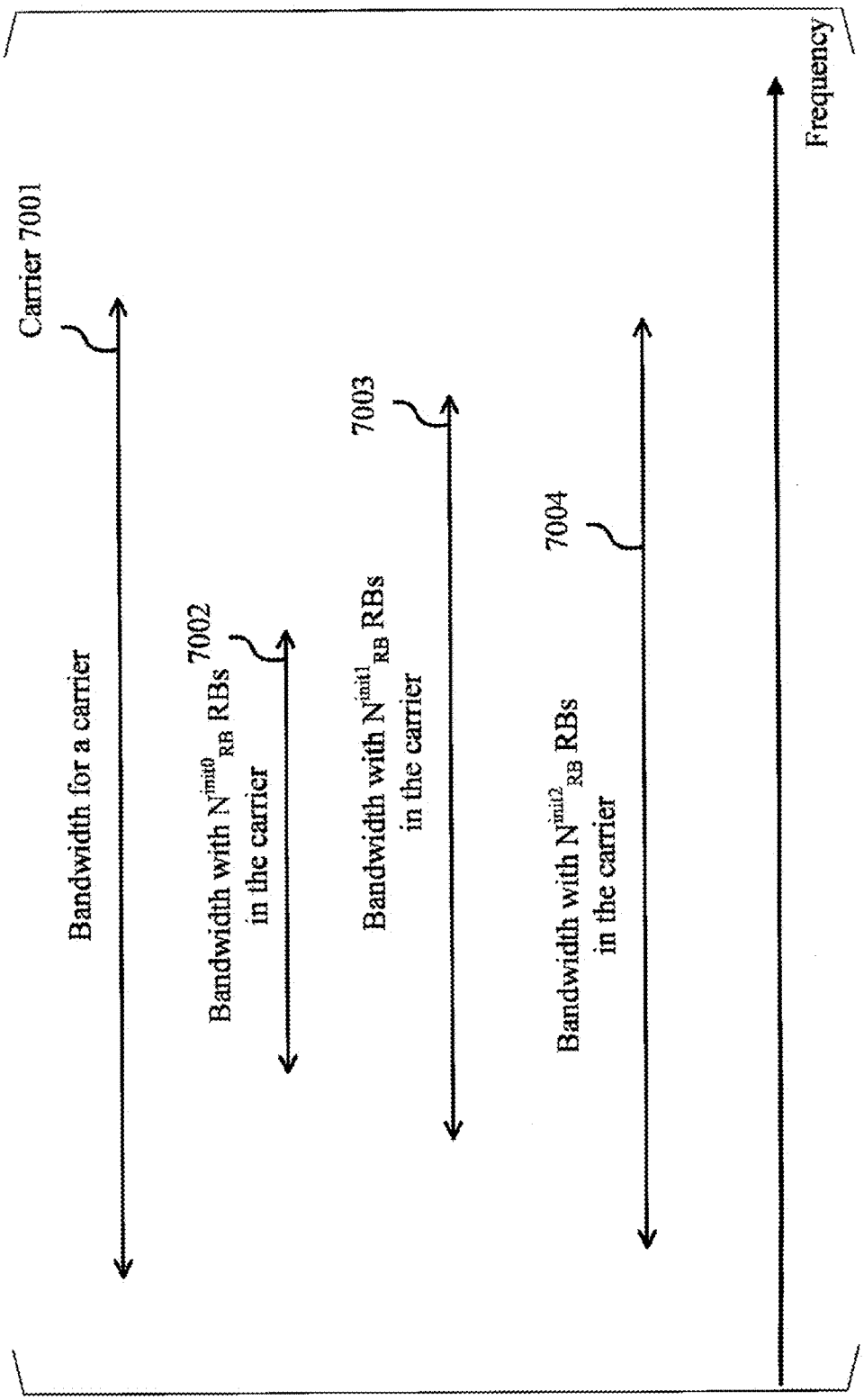
FIG. 7 is a diagram illustrating an example of downlink communication of the base station apparatus 3 and the terminal apparatus 1 according to an aspect of the present invention.

FIG. 7 is a diagram illustrating an example of downlink communication of the base station apparatus 3 and the terminal apparatus 1 according to an aspect of the present invention. A horizontal axis in FIG. 7 illustrates a frequency axis. A carrier 7001 is a bandwidth of a carrier. A reference sign 7002 denotes a bandwidth including $N^{init0}_{RB}$ resource blocks in the carrier 7001. A reference sign 7003 denotes a bandwidth including $N^{init1}_{RB}$ resource blocks in the carrier 7001. A reference sign 7004 denotes a bandwidth including $N^{init2}_{RB}$ resource blocks in the carrier 7001. The carrier 7001 includes the bandwidths denoted by 7002, 7003 and 7004.

$N^{init0}_{RB}$ is also referred to as the number of resource blocks of the bandwidth 7002. $N^{init1}_{RB}$ is also referred to as the number of resource blocks of the bandwidth 7003. $N^{init2}_{RB}$ is also referred to as the number of resource blocks of the bandwidth 7004.

The number $N^{init0}_{RB}$ of resource blocks of the bandwidth 7002 may be given at least based on the higher layer parameter PDCCH-ConfigSIB1. The number $N^{init0}_{RB}$ of resource blocks of the bandwidth 7002 may be given at least based on four bits of Most Significant Bits (MSB) in the higher layer parameter PDCCH-ConfigSIB1. The number $N^{init0}_{RB}$ of resource blocks of the bandwidth 7002 may be equal to the number $N^{CORESET\_init}_{RB}$ of resource blocks comprising an initial control resource set. The number $N^{init0}_{RB}$ of resource blocks of the bandwidth 7002 may be equal to the number $N^{CORESET\_init}_{RB}$ of resource blocks comprising the initial control resource set that is given at least based on the higher layer parameter PDCCH-ConfigSIB1. The number $N^{init0}_{RB}$ of resource blocks of the bandwidth 7002 may be equal to the number $N^{CORESET0}_{RB}$ of resource blocks comprising a control resource set of an index 0. The number $N^{init0}_{RB}$ of resource blocks of the bandwidth 7002 may be given at least based on a higher layer parameter ControlResourceSetZero. The higher layer parameter ControlResourceSetZero may be included in the SIB1. The higher layer parameter ControlResourceSetZero may be included in a higher layer parameter PDCCHConfigCommon. The interpretation of the higher layer parameter ControlResourceSetZero may be similar to the interpretation of four bits of the MSB in the higher layer parameter PDCCH-ConfigSIB1. The number $N^{init0}_{RB}$ of resource blocks of the bandwidth 7002 may be equal to the number $N^{CORESET0}_{RB}$ of resource blocks comprising the control resource set of the index 0 that is given based on the higher layer parameter ControlResourceSetZero. The initial control resource set may be the control resource set of the index 0. The bandwidth 7002 may be an initial downlink BWP (Initial DL BWP). The initial downlink BWP may be a downlink BWP of an index 0. The number $N^{init0}_{RB}$ of resource blocks of the bandwidth 7002 may be given by a resource block comprising a control resource set in which the DCI format is detected.

The number $N^{init1}_{RB}$ of resource blocks of the bandwidth 7003 may be given at least based on information included in the SIB1. The number $N^{init1}_{RB}$ of resource blocks of the bandwidth 7003 may be given at least based on a higher layer parameter LocationAndBandwidth. The higher layer parameter LocationAndBandwidth may be a parameter that gives the number $N^{init1}_{RB}$ of resource blocks of the bandwidth 7003. The higher layer parameter LocationAndBandwidth may be included in the SIB1. The bandwidth 7003 may be an initial downlink BWP. A PDCCH including the downlink DCI format may be monitored and received in the active downlink BWP. The number $N^{init1}_{RB}$ of resource blocks of the bandwidth 7003 may be given at least based on a higher layer parameter RRCSetup mapped to a CCCH. The number $N^{init1}_{RB}$ of resource blocks of the bandwidth 7003 may be given at least based on the higher layer parameter LocationAndBandwidth included in the higher layer parameter RRCSetup.

The number $N^{init2}_{RB}$ of resource blocks of the bandwidth 7004 may be given at least based on dedicated RRC signaling. The number $N^{init2}_{RB}$ of resource blocks of the bandwidth 7004 may be given at least based on the higher layer parameter LocationAndBandwidth included in the dedicated RRC signaling. The number $N^{init2}_{RB}$ of resource blocks of the bandwidth 7004 may be given at least based on the higher layer parameter RRCSetup mapped to the CCCH. The number $N^{init2}_{RB}$ of resource blocks of the bandwidth 7004 may be given at least based on the higher layer parameter LocationAndBandwidth included in the higher layer parameter RRCSetup. The bandwidth 7004 may be an active downlink BWP. The bandwidths 7003 and 7004 are not the active downlink BWPs at the same time.

The number $N_{bit}$ of bits of the frequency domain resource assignment field included in the downlink DCI format is given at least based on the number $N_{RB}$ of resource blocks comprising the bandwidth. For example, the number $N_{bit}$ of bits of the frequency domain resource assignment field included in the downlink DCI format may be given at least based on Equation (1).

$$N_{bit} = \text{ceil}(\log_2(N_{RB}(N_{RB}+1)/2)) \quad \text{[Equation 1]}$$

Here, ceil(A) is a ceiling function of A. Specifically, ceil(A) may be a function for outputting a minimum integer in a range of values not less than A.

The number $N_{bit}$ of bits of the frequency domain resource assignment field included in the downlink DCI format being given at least based on the number $N_{RB\_x}$ of resource blocks comprising the bandwidth may be the number $N_{bit}$ being given by setting $N_{RB\_x}$ in the $N_{RB}$ in Equation (1). For example, $N_{RB\_x}$ may be $N^{init0}_{RB}$, $N^{init1}_{RB}$, or $N^{init2}_{RB}$.

In other words, in a certain case, the number $N_{bit}$ of bits of the frequency domain resource assignment field included in the downlink DCI format may be given at least based on the number $N^{init0}_{RB}$ of resource blocks of the bandwidth 7002. In another case, the number $N_{bit}$ of bits of the frequency domain resource assignment field included in the downlink DCI format may be given at least based on the number $N^{init1}_{RB}$ of resource blocks of the bandwidth 7003. In another case, the number $N_{bit}$ of bits of the frequency domain resource assignment field included in the downlink DCI format may be given at least based on the number $N^{init2}_{RB}$ of resource blocks of the bandwidth 7004.

On the other hand, as illustrated in FIG. 7, in a case that multiple bandwidths are provided to the carrier, the number of bits of the frequency domain resource assignment field included in the downlink DCI format cannot be determined.

A type of a size of the DCI format for the PDCCH, which the terminal apparatus 1 can monitor in a slot, is limited to a prescribed value. This is because the terminal apparatus 1 is forced to attempt decoding for each size of the DCI format for the PDCCH, so exceeding the capability of the terminal apparatus 1 is prevented. For example, three types of size of the DCI format that the terminal apparatus 1 can monitor per slot may be used for the C-RNTI. One type of size of the DCI format that the terminal apparatus 1 can monitor per slot may be used for the RNTI other than the C-RNTI.

The various aspects of the apparatus according to an aspect of the present embodiment are at least preferable for solving the above-described problems. The present embodiment may be applied in a case that the bandwidth 7003 is the active downlink BWP, or in a case that bandwidth 7004 is the active downlink BWP. The aspect of the present embodiment applied in the case that the bandwidth 7003 is the active downlink BWP may be the same as or different from the aspect of the present embodiment applied in the case that bandwidth 7004 is the active downlink BWP.

The number of bits $N_{bit}$ of frequency domain resource assignment field in the downlink DCI format may be given at least based on some or all of elements E1 to E5. Furthermore, $N_{RB}$ in Equation (1) may be given at least based on some or all of the elements E1 to E5.

Element E1: RNTI used for scrambling CRC bits added to downlink DCI format

Element E2: Type of Search space set for downlink DCI format

Element E3: Control resource set associated with search space set for downlink DCI format Element E4: Downlink DCI format Element E5: Type of serving cell in which downlink DCI format is detected The frequency domain resource assignment field is also referred to as a FDRA (Frequency Domain Resource Allocation) field.

In the element E1, the RNTI used for scrambling the CRC bits added to the downlink DCI format may be any of the SI-RNTI, the RA-RNTI, the TC-RNTI, the P-RNTI, and the C-RNTI. The RNTI used for scrambling the CRC bits added to the downlink DCI format is also referred to as the RNTI for the downlink DCI format.

For example, in a case that the RNTI for the downlink DCI format is a first prescribed RNTI, the number $N_{bit}$ of bits of the FDRA field included in the downlink DCI format may be given at least based on the number $N^{init0}_{RB}$ of RBs of the bandwidth 7002. The first prescribed RNTI may include at least some or all of the SI-RNTI, the RA-RNTI, the TC-RNTI, the P-RNTI, and the C-RNTI.

For example, in a case that the RNTI for the downlink DCI format is a second prescribed RNTI, the number $N_{bit}$ of bits of the FDRA field included in the downlink DCI format may be given at least based on the number $N^{init1}_{RB}$ of RBs of the bandwidth 7003. The second prescribed RNTI may include at least some or all of the SI-RNTI, the RA-RNTI, the TC-RNTI, the P-RNTI, and the C-RNTI. Each of the SI-RNTI, the RA-RNTI, the TC-RNTI, the P-RNTI, and the C-RNTI may be included in only one of the first prescribed RNTI and the second prescribed RNTI.

For example, the first prescribed RNTI may include at least the SI-RNTI, and the second prescribed RNTI may include at least some or all of the RA-RNTI, the TC-RNTI, the P-RNTI, and the C-RNTI.

For example, the first prescribed RNTI may include at least some or all of the SI-RNTI, the RA-RNTI, the TC-RNTI, and the P-RNTI, and the second prescribed RNTI may include at least the C-RNTI.

In the element E2, the type of the search space set for the downlink DCI format may be any one of the type 0 PDCCH common search space, the type 0a PDCCH common search space, the type 1 PDCCH common search space, the type 2 PDCCH common search space, the type 3 PDCCH common search space, and the UE-specific PDCCH search space.

For example, for a first prescribed search space set for the downlink DCI format, the number $N_{bit}$ of bits of the FDRA field included in the downlink DCI format may be given at least based on the number $N^{init0}_{RB}$ of RBs of the bandwidth 7002. The first prescribed search space set may include at least some or all of the type 0 PDCCH common search space, the type 0a PDCCH common search space, the type 1 PDCCH common search space, the type 2 PDCCH common search space, the type 3 PDCCH common search space, and the UE-specific PDCCH search space.

For example, for a second prescribed search space set for the downlink DCI format, the number $N_{bit}$ of bits of the FDRA field included in the downlink DCI format may be given at least based on the number $N^{init}_{RB}$ of RBs of the bandwidth 7003. The second prescribed search space set may include at least some or all of the type 0 PDCCH common search space, the type 0a PDCCH common search space, the type 1 PDCCH common search space, the type 2 PDCCH common search space, the type 3 PDCCH common search space, and the UE-specific PDCCH search space. Each of the type 0 PDCCH common search space, the type 0a PDCCH common search space, the type 1 PDCCH common search space, the type 2 PDCCH common search space, the type 3 PDCCH common search space, and the UE-specific PDCCH search space may be included in only one of the first prescribed search space set and the second prescribed search space set.

The first prescribed search space set may include at least the type 0 PDCCH common search space, and the second prescribed search space set may include at least some or all of the type 0a PDCCH common search space, the type 1 PDCCH common search space, the type 2 PDCCH common search space, the type 3 PDCCH common search space, and the UE-specific PDCCH search space.

The first prescribed search space set may include at least one or both of the type 0 PDCCH common search space and the type 0a PDCCH common search space, and the second prescribed search space set may include at least some or all of the type 1 PDCCH common search space, the type 2 PDCCH common search space, the type 3 PDCCH common search space, and the UE-specific PDCCH search space.

The first prescribed search space set may include at least some or all of the type 0 PDCCH common search space, the type 0a PDCCH common search space, the type 1 PDCCH common search space, the type 2 PDCCH common search space, and the type 3 PDCCH common search space, and the second prescribed search space set may include at least the UE-specific PDCCH search space.

In the element E3, the control resource set associated with the search space set for the downlink DCI format may be identified based on the index of the control resource set. The control resource set may include at least some or all of the initial control resource set, the control resource set of the index 0, the SIB1 control resource set, and the dedicated control resource set.

For example, for a first prescribed control resource set associated with the search space set for the downlink DCI format, the number $N_{bit}$ of bits of the FDRA field included in the downlink DCI format may be given at least based on the number $N^{init0}_{RB}$ of RBs of the bandwidth 7002. The first prescribed control resource set may include at least some or all of the initial control resource set, the control resource set of the index 0 (CORESET #0), the SIB1 control resource set, and the dedicated control resource set.

The common control resource set is referred as those including some or all of the initial control resource set, the control resource set of the index 0, and the SIB1 control resource set. The SIB1 control resource set is, the SIB1 control resource set is a control resource set that is given at least based on a higher layer parameter included in the SIB1.

For example, for a second prescribed control resource set associated with the search space set for the downlink DCI format, the number $N_{bit}$ of bits of the FDRA field included in the downlink DCI format may be given at least based on the number $N^{init1}_{RB}$ of RBs of the bandwidth 7003. The second prescribed control resource set may include at least some or all of the initial control resource set, the control resource set of the index 0 (CORESET #0), the SIB1 control resource set, and the dedicated control resource set. Each of the initial control resource set, the control resource set of the index 0 (CORESET #0), the SIB1 control resource set, and the dedicated control resource set may be included in only one of the first prescribed control resource set and the second prescribed control resource set.

For example, the first prescribed control resource set may include at least some or all of the initial control resource set, the control resource set of the index 0, and the SIB1 control resource set, and the second prescribed control resource set may include at least the dedicated control resource set.

For example, the first prescribed control resource set may include at least the initial control resource set, and the second prescribed control resource set may include at least some or all of the control resource set of the index 0, the SIB1 control resource set, and the dedicated control resource set.

In the element E4, the downlink DCI format may be any one of DCI format 1_0 and DCI format 1_1.

For example, in a case that the downlink DCI format is a first prescribed downlink DCI format, the number $N_{bit}$ of bits of the FDRA field included in the downlink DCI format may be given at least based on the number $N^{init0}_{RB}$ of RBs of the bandwidth 7002. The first prescribed downlink DCI format may include at least one or both of DCI format 1_0 and DCI format 1_1.

For example, in a case that the downlink DCI format is a second prescribed downlink DCI format, the number $N_{bit}$ of bits of the FDRA field included in the downlink DCI format may be given at least based on the number $N^{init1}_{RB}$ of RBs of the bandwidth 7003. The second prescribed downlink DCI format may include at least one or both of DCI format 1_0 and DCI format 1_1. Each of DCI format 1_0 and DCI format 1_1 may be included in only one of the first prescribed downlink DCI format and the second prescribed downlink DCI format.

For example, the first prescribed downlink DCI format may include DCI format 1_0, and the second prescribed downlink DCI format may include DCI format 1_1.

In the element E5, the type of the serving cell in which the downlink DCI format is detected may be either the PCell, the PSCell, or the SCell.

For example, in a case that the serving cell in which the downlink DCI format is detected is a first prescribed serving cell, the number $N_{bit}$ of bits of the FDRA field included in the downlink DCI format may be given at least based on the number $N^{init0}_{RB}$ of RBs of the bandwidth 7002. The first prescribed serving cell may include at least some or all of the PCell, the PSCell, or the SCell.

For example, in a case that the serving cell in which the downlink DCI format is detected is a second prescribed serving cell, the number $N_{bit}$ of bits of the FDRA field included in the downlink DCI format may be given at least based on the number $N^{init1}_{RB}$ of RBs of the bandwidth 7003. The second prescribed serving cell may include at least some or all of the PCell, the PSCell, or the SCell. Each of the PCell, the PSCell, and the SCell may be included in only one of the first prescribed serving cell and the second prescribed serving cell.

For example, the first prescribed serving cell may include at least one or both of the PCell and the PSCell, and the second prescribed serving cell may include at least the SCell.

The various aspects of the apparatus according to an aspect of the present embodiment may be provided including at least some or all of Embodiments A1 to A60 described below. The various aspects of the apparatus according to an aspect of the present embodiment may be provided at least based on a combination of some or all of Embodiments A1 to A60 described below.

In Embodiment A1, in a case that the RNTI for the downlink DCI format is an SI-RNTI and the control resource set associated with the search space set for the downlink DCI format is a common control resource set, the number $N_{bit}$ of bits of the FDRA field included in the downlink DCI format is given at least based on the number $N^{init0}_{RB}$ of RBs of the bandwidth 7002.

In Embodiment A2, in a case that the RNTI for the downlink DCI format is an SI-RNTI and the control resource set associated with the search space set for the downlink DCI format is a common control resource set, the number $N_{bit}$ of bits of the FDRA field included in the downlink DCI format is given at least based on the number $N^{inti1}_{RB}$ of RBs of the bandwidth 7003.

In Embodiment A3, in a case that the RNTI for the downlink DCI format is an SI-RNTI and the control resource set associated with the search space set for the downlink DCI format is a dedicated control resource set, the number $N_{bit}$ of bits of the FDRA field included in the downlink DCI format is given at least based on the number $N^{inti0}_{RB}$ of RBs of the bandwidth 7002.

In Embodiment A4, in a case that the RNTI for the downlink DCI format is an SI-RNTI and the control resource set associated with the search space set for the downlink DCI format is a dedicated control resource set, the number $N_{bit}$ of bits of the FDRA field included in the downlink DCI format is given at least based on the number $N^{inti1}_{RB}$ of RBs of the bandwidth 7003.

In Embodiment A5, in a case that the RNTI for the downlink DCI format is a RA-RNTI and the control resource set associated with the search space set for the downlink DCI format is a common control resource set, the number $N_{bit}$ of bits of the FDRA field included in the downlink DCI format is given at least based on the number $N^{init0}_{RB}$ of RBs of the bandwidth 7002.

In Embodiment A6, in a case that the RNTI for the downlink DCI format is a RA-RNTI and the control resource set associated with the search space set for the downlink DCI format is a common control resource set, the number $N_{bit}$ of bits of the FDRA field included in the downlink DCI format is given at least based on the number $N^{init1}_{RB}$ of RBs of the bandwidth 7003.

In Embodiment A7, in a case that the RNTI for the downlink DCI format is a RA-RNTI and the control resource set associated with the search space set for the downlink DCI format is a dedicated control resource set, the number $N_{bit}$ of bits of the FDRA field included in the downlink DCI format is given at least based on the number $N^{init0}_{RB}$ of RBs of the bandwidth 7002.

In Embodiment A8, in a case that the RNTI for the downlink DCI format is a RA-RNTI and the control resource set associated with the search space set for the downlink DCI format is a dedicated control resource set, the number $N_{bit}$ of bits of the FDRA field included in the downlink DCI format is given at least based on the number $N^{inti1}_{RB}$ of RBs of the bandwidth 7003.

In Embodiment A9, in a case that the RNTI for the downlink DCI format is a TC-RNTI and the control resource set associated with the search space set for the downlink DCI format is a common control resource set, the number $N_{bit}$ of bits of the FDRA field included in the downlink DCI format is given at least based on the number $N^{init0}_{RB}$ of RBs of the bandwidth 7002.

In Embodiment A10, in a case that the RNTI for the downlink DCI format is a TC-RNTI and the control resource set associated with the search space set for the downlink DCI format is a common control resource set, the number $N_{bit}$ of bits of the FDRA field included in the downlink DCI format is given at least based on the number $N^{init1}_{RB}$ of RBs of the bandwidth 7003.

In Embodiment A11, in a case that the RNTI for the downlink DCI format is a TC-RNTI and the control resource set associated with the search space set for the downlink DCI format is a dedicated control resource set, the number $N_{bit}$ of bits of the FDRA field included in the downlink DCI format is given at least based on the number $N^{init0}_{RB}$ of RBs of the bandwidth 7002.

In Embodiment A12, in a case that the RNTI for the downlink DCI format is a TC-RNTI and the control resource set associated with the search space set for the downlink DCI format is a dedicated control resource set, the number $N_{bit}$ of bits of the FDRA field included in the downlink DCI format is given at least based on the number $N^{init1}_{RB}$ of RBs of the bandwidth 7003.

In Embodiment A13, in a case that the RNTI for the downlink DCI format is a P-RNTI and the control resource set associated with the search space set for the downlink DCI format is a common control resource set, the number $N_{bit}$ of bits of the FDRA field included in the downlink DCI format is given at least based on the number $N^{init0}_{RB}$ of RBs of the bandwidth 7002.

In Embodiment A14, in a case that the RNTI for the downlink DCI format is a P-RNTI and the control resource set associated with the search space set for the downlink DCI format is a common control resource set, the number $N_{bit}$ of bits of the FDRA field included in the downlink DCI format is given at least based on the number $N^{init1}_{RB}$ of RBs of the bandwidth 7003.

In Embodiment A15, in a case that the RNTI for the downlink DCI format is a P-RNTI and the control resource set associated with the search space set for the downlink DCI format is a dedicated control resource set, the number $N_{bit}$ of bits of the FDRA field included in the downlink DCI format is given at least based on the number $N^{init0}_{RB}$ of RBs of the bandwidth 7002.

In Embodiment A16, in a case that the RNTI for the downlink DCI format is a P-RNTI and the control resource set associated with the search space set for the downlink DCI format is a dedicated control resource set, the number $N_{bit}$ of bits of the FDRA field included in the downlink DCI format is given at least based on the number $N^{init1}_{RB}$ of RBs of the bandwidth 7003.

In Embodiment A17, in a case that the RNTI for the downlink DCI format is a C-RNTI, the control resource set associated with the search space set for the downlink DCI format is a common control resource set, and the type of the search space set is a type 0 PDCCH common search space, the number $N_{bit}$ of bits of the FDRA field included in the downlink DCI format is given at least based on the number $N^{init0}_{RB}$ of RBs of the bandwidth 7002.

In Embodiment A18, in a case that the RNTI for the downlink DCI format is a C-RNTI, the control resource set associated with the search space set for the downlink DCI format is a common control resource set, and the type of the search space set is a type 0 PDCCH common search space, the number $N_{bit}$ of bits of the FDRA field included in the downlink DCI format is given at least based on the number $N^{init1}_{RB}$ of RBs of the bandwidth 7003.

In Embodiment A19, in a case that the RNTI for the downlink DCI format is a C-RNTI, the control resource set associated with the search space set for the downlink DCI format is a common control resource set, and the type of the search space set is a type 0 PDCCH common search space, the number $N_{bit}$ of bits of the FDRA field included in the downlink DCI format is given at least based on the number $N^{init2}_{RB}$ of RBs of the bandwidth 7004.

In Embodiment A20, in a case that the RNTI for the downlink DCI format is a C-RNTI, the control resource set associated with the search space set for the downlink DCI format is a common control resource set, and the type of the search space set is a type 0a PDCCH common search space, the number $N_{bit}$ of bits of the FDRA field included in the downlink DCI format is given at least based on the number $N^{init0}_{RB}$ of RBs of the bandwidth 7002.

In Embodiment A21, in a case that the RNTI for the downlink DCI format is a C-RNTI, the control resource set associated with the search space set for the downlink DCI format is a common control resource set, and the type of the search space set is a type 0a PDCCH common search space, the number $N_{bit}$ of bits of the FDRA field included in the downlink DCI format is given at least based on the number $N^{init1}_{RB}$ of RBs of the bandwidth 7003.

In Embodiment A22, in a case that the RNTI for the downlink DCI format is a C-RNTI, the control resource set associated with the search space set for the downlink DCI format is a common control resource set, and the type of the search space set is a type 0a PDCCH common search space, the number $N_{bit}$ of bits of the FDRA field included in the downlink DCI format is given at least based on the number $N^{init2}_{RB}$ of RBs of the bandwidth 7004.

In Embodiment A23, in a case that the RNTI for the downlink DCI format is a C-RNTI, the control resource set associated with the search space set for the downlink DCI format is a common control resource set, and the type of the search space set is a type 1 PDCCH common search space, the number $N_{bit}$ of bits of the FDRA field included in the downlink DCI format is given at least based on the number $N^{init0}_{RB}$ of RBs of the bandwidth 7002.

In Embodiment A24, in a case that the RNTI for the downlink DCI format is a C-RNTI, the control resource set associated with the search space set for the downlink DCI format is a common control resource set, and the type of the search space set is a type 1 PDCCH common search space, the number $N_{bit}$ of bits of the FDRA field included in the downlink DCI format is given at least based on the number $N^{init1}_{RB}$ of RBs of the bandwidth 7003.

In Embodiment A25, in a case that the RNTI for the downlink DCI format is a C-RNTI, the control resource set associated with the search space set for the downlink DCI format is a common control resource set, and the type of the search space set is a type 1 PDCCH common search space, the number $N_{bit}$ of bits of the FDRA field included in the downlink DCI format is given at least based on the number $N^{init2}_{RB}$ of RBs of the bandwidth 7004.

In Embodiment A26, in a case that the RNTI for the downlink DCI format is a C-RNTI, the control resource set associated with the search space set for the downlink DCI format is a common control resource set, and the type of the search space set is a type 2 PDCCH common search space, the number $N_{bit}$ of bits of the FDRA field included in the downlink DCI format is given at least based on the number $N^{init0}_{RB}$ of RBs of the bandwidth 7002.

In Embodiment A27, in a case that the RNTI for the downlink DCI format is a C-RNTI, the control resource set associated with the search space set for the downlink DCI format is a common control resource set, and the type of the search space set is a type 2 PDCCH common search space, the number $N_{bit}$ of bits of the FDRA field included in the downlink DCI format is given at least based on the number $N^{init1}_{RB}$ of RBs of the bandwidth 7003.

In Embodiment A28, in a case that the RNTI for the downlink DCI format is a C-RNTI, the control resource set associated with the search space set for the downlink DCI format is a common control resource set, and the type of the search space set is a type 2 PDCCH common search space, the number $N_{bit}$ of bits of the FDRA field included in the downlink DCI format is given at least based on the number $N^{init2}_{RB}$ of RBs of the bandwidth 7004.

In Embodiment A29, in a case that the RNTI for the downlink DCI format is a C-RNTI, the control resource set associated with the search space set for the downlink DCI format is a common control resource set, and the type of the search space set is a type 3 PDCCH common search space, the number $N_{bit}$ of bits of the FDRA field included in the downlink DCI format is given at least based on the number $N^{init0}_{RB}$ of RBs of the bandwidth 7002.

In Embodiment A30, in a case that the RNTI for the downlink DCI format is a C-RNTI, the control resource set associated with the search space set for the downlink DCI format is a common control resource set, and the type of the search space set is a type 3 PDCCH common search space, the number $N_{bit}$ of bits of the FDRA field included in the downlink DCI format is given at least based on the number $N^{init1}_{RB}$ of RBs of the bandwidth 7003.

In Embodiment A31, in a case that the RNTI for the downlink DCI format is a C-RNTI, the control resource set associated with the search space set for the downlink DCI format is a common control resource set, and the type of the search space set is a type 3 PDCCH common search space, the number $N_{bit}$ of bits of the FDRA field included in the downlink DCI format is given at least based on the number $N^{init2}_{RB}$ of RBs of the bandwidth 7004.

In Embodiment A32, in a case that the RNTI for the downlink DCI format is a C-RNTI, the control resource set associated with the search space set for the downlink DCI format is a common control resource set, and the type of the search space set is a UE-specific PDCCH search space, the number $N_{bit}$ of bits of the FDRA field included in the downlink DCI format is given at least based on the number $N^{init0}_{RB}$ of RBs of the bandwidth 7002.

In Embodiment A33, in a case that the RNTI for the downlink DCI format is a C-RNTI, the control resource set associated with the search space set for the downlink DCI format is a common control resource set, and the type of the search space set is a UE-specific PDCCH search space, the number $N_{bit}$ of bits of the FDRA field included in the downlink DCI format is given at least based on the number $N^{init1}_{RB}$ of RBs of the bandwidth 7003.

In Embodiment A34, in a case that the RNTI for the downlink DCI format is a C-RNTI, the control resource set associated with the search space set for the downlink DCI format is a common control resource set, and the type of the search space set is a UE-specific PDCCH search space, the number $N_{bit}$ of bits of the FDRA field included in the downlink DCI format is given at least based on the number $N^{init2}_{RB}$ of RBs of the bandwidth 7004.

In Embodiment A35, in a case that the RNTI for the downlink DCI format is a C-RNTI, the control resource set associated with the search space set for the downlink DCI format is a dedicated control resource set, and the type of the search space set is a type 0 PDCCH common search space, the number $N_{bit}$ of bits of the FDRA field included in the downlink DCI format is given at least based on the number $N^{init0}_{RB}$ of RBs of the bandwidth 7002.

In Embodiment A36, in a case that the RNTI for the downlink DCI format is a C-RNTI, the control resource set associated with the search space set for the downlink DCI format is a dedicated control resource set, and the type of the search space set is a type 0 PDCCH common search space, the number $N_{bit}$ of bits of the FDRA field included in the downlink DCI format is given at least based on the number $N^{init1}_{RB}$ of RBs of the bandwidth 7003.

In Embodiment A37, in a case that the RNTI for the downlink DCI format is a C-RNTI, the control resource set associated with the search space set for the downlink DCI format is a dedicated control resource set, and the type of the search space set is a type 0 PDCCH common search space, the number $N_{bit}$ of bits of the FDRA field included in the downlink DCI format is given at least based on the number $N^{init2}_{RB}$ of RBs of the bandwidth 7004.

In Embodiment A38, in a case that the RNTI for the downlink DCI format is a C-RNTI, the control resource set associated with the search space set for the downlink DCI format is a dedicated control resource set, and the type of the search space set is a type 0a PDCCH common search space, the number $N_{bit}$ of bits of the FDRA field included in the downlink DCI format is given at least based on the number $N^{init0}_{RB}$ of RBs of the bandwidth 7002.

In Embodiment A39, in a case that the RNTI for the downlink DCI format is a C-RNTI, the control resource set associated with the search space set for the downlink DCI format is a dedicated control resource set, and the type of the search space set is a type 0a PDCCH common search space, the number $N_{bit}$ of bits of the FDRA field included in the downlink DCI format is given at least based on the number $N^{init1}_{RB}$ of RBs of the bandwidth 7003.

In Embodiment A40, in a case that the RNTI for the downlink DCI format is a C-RNTI, the control resource set associated with the search space set for the downlink DCI format is a dedicated control resource set, and the type of the search space set is a type 0a PDCCH common search space, the number $N_{bit}$ of bits of the FDRA field included in the downlink DCI format is given at least based on the number $N^{init2}_{RB}$ of RBs of the bandwidth 7004.

In Embodiment A41, in a case that the RNTI for the downlink DCI format is a C-RNTI, the control resource set associated with the search space set for the downlink DCI format is a dedicated control resource set, and the type of the search space set is a type 1 PDCCH common search space, the number $N_{bit}$ of bits of the FDRA field included in the downlink DCI format is given at least based on the number $N^{init0}_{RB}$ of RBs of the bandwidth 7002.

In Embodiment A42, in a case that the RNTI for the downlink DCI format is a C-RNTI, the control resource set associated with the search space set for the downlink DCI format is a dedicated control resource set, and the type of the search space set is a type 1 PDCCH common search space, the number $N_{bit}$ of bits of the FDRA field included in the downlink DCI format is given at least based on the number $N^{init1}_{RB}$ of RBs of the bandwidth 7003.

In Embodiment A43, in a case that the RNTI for the downlink DCI format is a C-RNTI, the control resource set associated with the search space set for the downlink DCI format is a dedicated control resource set, and the type of the search space set is a type 1 PDCCH common search space, the number $N_{bit}$ of bits of the FDRA field included in the downlink DCI format is given at least based on the number $N^{init2}_{RB}$ of RBs of the bandwidth 7004.

In Embodiment A44, in a case that the RNTI for the downlink DCI format is a C-RNTI, the control resource set associated with the search space set for the downlink DCI format is a dedicated control resource set, and the type of the search space set is a type 2 PDCCH common search space, the number $N_{bit}$ of bits of the FDRA field included in the downlink DCI format is given at least based on the number $N^{init0}_{RB}$ of RBs of the bandwidth 7002.

In Embodiment A45, in a case that the RNTI for the downlink DCI format is a C-RNTI, the control resource set associated with the search space set for the downlink DCI format is a dedicated control resource set, and the type of the search space set is a type 2 PDCCH common search space, the number $N_{bit}$ of bits of the FDRA field included in the downlink DCI format is given at least based on the number $N^{init1}_{RB}$ of RBs of the bandwidth 7003.

In Embodiment A46, in a case that the RNTI for the downlink DCI format is a C-RNTI, the control resource set associated with the search space set for the downlink DCI format is a dedicated control resource set, and the type of the search space set is a type 2 PDCCH common search space, the number $N_{bit}$ of bits of the FDRA field included in the downlink DCI format is given at least based on the number $N^{init2}_{RB}$ of RBs of the bandwidth 7004.

In Embodiment A47, in a case that the RNTI for the downlink DCI format is a C-RNTI, the control resource set associated with the search space set for the downlink DCI format is a dedicated control resource set, and the type of the search space set is a type 3 PDCCH common search space, the number $N_{bit}$ of bits of the FDRA field included in the downlink DCI format is given at least based on the number $N^{init0}_{RB}$ of RBs of the bandwidth 7002.

In Embodiment A48, in a case that the RNTI for the downlink DCI format is a C-RNTI, the control resource set associated with the search space set for the downlink DCI format is a dedicated control resource set, and the type of the search space set is a type 3 PDCCH common search space, the number $N_{bit}$ of bits of the FDRA field included in the downlink DCI format is given at least based on the number $N^{init1}_{RB}$ of RBs of the bandwidth 7003.

In Embodiment A49, in a case that the RNTI for the downlink DCI format is a C-RNTI, the control resource set associated with the search space set for the downlink DCI format is a dedicated control resource set, and the type of the search space set is a type 3 PDCCH common search space, the number $N_{bit}$ of bits of the FDRA field included in the downlink DCI format is given at least based on the number $N^{init2}_{RB}$ of RBs of the bandwidth 7004.

In Embodiment A50, in a case that the RNTI for the downlink DCI format is a C-RNTI, the control resource set associated with the search space set for the downlink DCI format is a dedicated control resource set, and the type of the search space set is a UE-specific PDCCH search space, the number $N_{bit}$ of bits of the FDRA field included in the downlink DCI format is given at least based on the number $N^{init0}_{RB}$ of RBs of the bandwidth 7002.

In Embodiment A51, in a case that the RNTI for the downlink DCI format is a C-RNTI, the control resource set associated with the search space set for the downlink DCI format is a dedicated control resource set, and the type of the search space set is a UE-specific PDCCH search space, the number $N_{bit}$ of bits of the FDRA field included in the downlink DCI format is given at least based on the number $N^{init1}{}_{RB}$ of RBs of the bandwidth 7003.

In Embodiment A52, in a case that the RNTI for the downlink DCI format is a C-RNTI, the control resource set associated with the search space set for the downlink DCI format is a dedicated control resource set, and the type of the search space set is a UE-specific PDCCH search space, the number $N_{bit}$ of bits of the FDRA field included in the downlink DCI format is given at least based on the number $N^{init2}{}_{RB}$ of RBs of the bandwidth 7004.

In Embodiment A53, in a case that the RNTI for the downlink DCI format is a C-RNTI, the control resource set associated with the search space set for the downlink DCI format is a common control resource set, the type of the search space set is a UE-specific PDCCH search space, the downlink DCI format is DCI format 1_0, and a condition 101 for the DCI size is not satisfied in a slot in which the downlink DCI format is monitored, the number $N_{bit}$ of bits of the FDRA field included in the downlink DCI format is given at least based on the number $N^{init0}{}_{RB}$ of RBs of the bandwidth 7002.

In Embodiment A54, in a case that the RNTI for the downlink DCI format is a C-RNTI, the control resource set associated with the search space set for the downlink DCI format is a common control resource set, the type of the search space set is a UE-specific PDCCH search space, the downlink DCI format is DCI format 1_0, and the condition 101 for the DCI size is not satisfied in a slot in which the downlink DCI format is monitored, the number $N_{bit}$ of bits of the FDRA field included in the downlink DCI format is given at least based on the number $N^{init1}{}_{RB}$ of RBs of the bandwidth 7003.

In Embodiment A55, in a case that the RNTI for the downlink DCI format is a C-RNTI, the control resource set associated with the search space set for the downlink DCI format is a common control resource set, the type of the search space set is a UE-specific PDCCH search space, the downlink DCI format is DCI format 1_0, and the condition 101 for the DCI size is satisfied in a slot in which the downlink DCI format is monitored, the number $N_{bit}$ of bits of the FDRA field included in the downlink DCI format is given at least based on the number $N^{init2}{}_{RB}$ of RBs of the bandwidth 7004.

In Embodiment A56, in a case that the RNTI for the downlink DCI format is a C-RNTI, the control resource set associated with the search space set for the downlink DCI format is a common control resource set, the type of the search space set is a UE-specific PDCCH search space, and the downlink DCI format is DCI format 1_1, the number $N_{bit}$ of bits of the FDRA field included in the downlink DCI format is given at least based on the number $N^{init2}{}_{RB}$ of RBs of the bandwidth 7004.

In Embodiment A57, in a case that the RNTI for the downlink DCI format is a C-RNTI, the control resource set associated with the search space set for the downlink DCI format is a dedicated control resource set, the type of the search space set is a UE-specific PDCCH search space, the downlink DCI format is DCI format 1_0, and the condition 101 for the DCI size is not satisfied in a slot in which the downlink DCI format is monitored, the number $N_{bit}$ of bits of the FDRA field included in the downlink DCI format is given at least based on the number $N^{init1}{}_{RB}$ of RBs of the bandwidth 7002.

In Embodiment A58, in a case that the RNTI for the downlink DCI format is a C-RNTI, the control resource set associated with the search space set for the downlink DCI format is a dedicated control resource set, the type of the search space set is a UE-specific PDCCH search space, the downlink DCI format is DCI format 1_0, and the condition 101 for the DCI size is not satisfied in a slot in which the downlink DCI format is monitored, the number $N_{bit}$ of bits of the FDRA field included in the downlink DCI format is given at least based on the number $N^{init1}{}_{RB}$ of RBs of the bandwidth 7003.

In Embodiment A59, in a case that the RNTI for the downlink DCI format is a C-RNTI, the control resource set associated with the search space set for the downlink DCI format is a dedicated control resource set, the type of the search space set is a UE-specific PDCCH search space, the downlink DCI format is DCI format 1_0, and the condition 101 for the DCI size is satisfied in a slot in which the downlink DCI format is monitored, the number $N_{bit}$ of bits of the FDRA field included in the downlink DCI format is given at least based on the number $N^{init2}{}_{RB}$ of RBs of the bandwidth 7004.

In Embodiment A60, in a case that the RNTI for the downlink DCI format is a C-RNTI, the control resource set associated with the search space set for the downlink DCI format is a dedicated control resource set, the type of the search space set is a UE-specific PDCCH search space, and the downlink DCI format is DCI format 1_1, the number $N_{bit}$ of bits of the FDRA field included in the downlink DCI format is given at least based on the number $N^{init2}{}_{RB}$ of RBs of the bandwidth 7004.

A value of the FDRA field included in the downlink DCI format is given at least based on an index $RB_{start}$ at the beginning of the resource blocks to which the PDSCH is mapped and the number $L_{RBs}$ of resource blocks to which the PDSCH is mapped. The PDSCH is a PDSCH that is scheduled at least based on the downlink DCI format.

Figure 8:
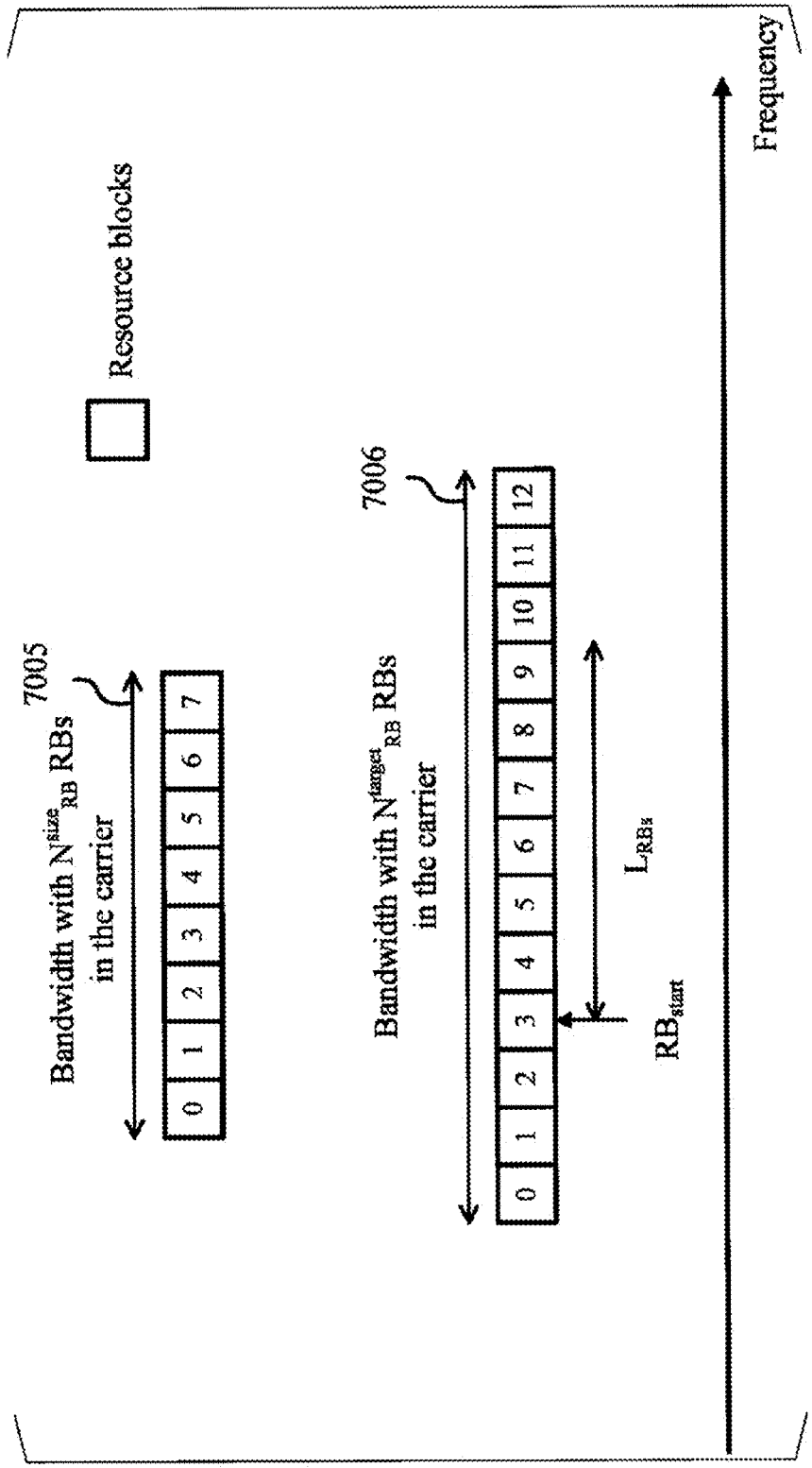
FIG. 8 is a diagram illustrating an example of PDSCH resource allocation according to an aspect of the present embodiment.

FIG. 8 is a diagram illustrating an example of PDSCH resource allocation according to an aspect of the present embodiment. A reference sign 7005 denotes a bandwidth including $N^{size}{}_{RB}$ resource blocks in the carrier 7001. A reference sign 7006 denotes a bandwidth including $N^{target}{}_{RB}$ resource blocks in the carrier 7001. The blocks illustrated in FIG. 8 represent resource blocks, and values indicated in the respective blocks represent indexes of the resource blocks. In FIG. 8, $N^{sizehd\ RB}=8$ and $N^{target}{}_{RB}=13$. The index $RB_{start}$ at the beginning of the resource blocks to which the PDSCH is mapped is given $RB_{start}=3$, and the number $L_{RBs}$ of resource blocks to which the PDSCH is mapped is given $L_{RBs}=7$.

In a case that the number $N_{bit}$ of bits of the FDRA field included in the downlink DCI format is given at least based on the number $N^{target}{}_{RB}$ of RBs of the bandwidth 7006, and the FDRA field is applied to the bandwidth 7006, a value $N_{RIV}$ of the FDRA field may be given based on a first method.

The FDRA field being applied to the bandwidth may be the PDSCH scheduled at least based on the DCI format including the FDRA field being mapped to the bandwidth.

In a case that the number $N_{bit}$ of bits of the FDRA field included in the downlink DCI format is given at least based on the number $N^{size}{}_{RB}$ of RBs of the bandwidth 7005, and the FDRA field is applied to the bandwidth 7006, the value $N_{RIV}$ of the FDRA field may be given based on a second method.

In the first method, in a case that $L_{RBs}-1 \leq \text{floor}(N^{target}{}_{RB}/2)$ is satisfied, $N_{RIV}=N^{target}{}_{RB}*(L_{RBs}-1)+RB_{start}$ may be given. In addition, in the first method, in a case that $L_{RBs}-1 \leq \text{floor}(N^{target}_{RB}/2)$ is not satisfied, $N_{RIV}=N^{target}_{RB}*(N^{target}_{RB}-L_{RBs}+1)+N^{target}_{RB}-1-RB_{start}$ may be given. In the first method, the $L_{RBs}$ does not exceed $N^{target}_{start}-RB_{start}$.

Here, floor(B) is a floor function. floor(B) may be a function for outputting a largest integer within a range that does not exceed B.

In the second method, in a case that $L_{RBs}-1 \leq \text{floor}(N^{size}_{RB}/2)$ is satisfied, $N_{RIV}=N^{size}_{RB}*(L^2_{RBs}-1)+RB^2_{start}$ may be given. In addition, in the second method, in a case that $L_{RBs}-1 \leq \text{floor}(N^{size}_{RB}/2)$ is not satisfied, $N_{RIV}=N^{size}_{RB}(N^{*size}_{RB}-L_{RBs}+1)+N^{size}_{RB}-1-RB^2_{start}$ may be given. In the second method, $L_{RBs}=L_{RBs}/K_{RBG}$ is given. In the second method, $RB^2_{start}=RB_{start}/K_{RBG}$ is given. In the second method, $L_{RBs}$ does not exceed $N^{size}_{RB}-RB^2_{start}$.

In the second method, in a case that $N^{target}_{RB} > N^{size}_{RB}$ is satisfied, K may be the maximum value among 1, 2, 4, and 8 under a condition satisfying $K \leq \text{floor}(N^{target}_{RB}/N_{sizeRB})$. In the second method, in a case that $N^{target}_{RB} > N^{size}_{RB}$ is not satisfied, K may be K=1.

The number $N_{bit}$ of bits of the FDRA field included in the downlink DCI format may be given at least based on the number $N^{init0}_{RB}$ of RBs of the bandwidth 7002, and the FDRA field may be applied to the bandwidth 7003.

In a case that the initial downlink BWP is an active downlink BWP, for the first prescribed search space set for the downlink DCI format, the number $N_{bit}$ of bits of the FDRA field included in the downlink DCI format may be given at least based on the number $N^{init0}_{RB}$ of RBs of the bandwidth 7002, and the FDRA field may be applied to the bandwidth 7002.

In a case that the initial downlink BWP is an active downlink BWP, for the first prescribed search space set for the downlink DCI format, the number $N_{bit}$ of bits of the FDRA field included in the downlink DCI format may be given at least based on the number $N^{init0}_{RB}$ of RBs of the bandwidth 7002, and the FDRA field may be applied to the bandwidth 7003.

In a case that the downlink DCI format is DCI format 1_0, for the first prescribed search space set for the downlink DCI format, the number $N_{bit}$ of bits of the FDRA field included in the downlink DCI format may be given at least based on the number $N^{init0}_{RB}$ of RBs of the bandwidth 7002, and the FDRA field may be applied to the bandwidth 7002.

In a case that the downlink DCI format is DCI format 1_0, and the condition 101 for the DCI size is not satisfied in a slot in which the downlink DCI format is monitored, for the second prescribed search space set for the downlink DCI format, the number $N_{bit}$ of bits of the FDRA field included in the downlink DCI format may be given at least based on the number $N^{init0}_{RB}$ of RBs of the bandwidth 7002, and the FDRA field may be applied to the bandwidth 7003.

In a case that the downlink DCI format is DCI format 1_0, and the condition 101 for the DCI size is satisfied in a slot in which the downlink DCI format is monitored, for the second prescribed search space set for the downlink DCI format, the number $N_{bit}$ of bits of the FDRA field included in the downlink DCI format may be given at least based on the number $N^{init1}_{RB}$ of RBs of the bandwidth 7003, and the FDRA field may be applied to the bandwidth 7003.

In a case that the downlink DCI format is DCI format 1_1, the number $N_{bit}$ of bits of the FDRA field included in the downlink DCI format may be given at least based on the number $N^{init1}_{RB}$ of RBs of the bandwidth 7003, and the FDRA field may be applied to the bandwidth 7003.

The bandwidths 7002 and 7003 may be the initial downlink BWPs. In other words, two bandwidths may be configured for the initial downlink BWP. The bandwidth 7002 may be an initial downlink BWP, and the bandwidth 7003 may be an active downlink BWP.

The number $N^{size}_{RB}$ of RBs of the bandwidth 7005 may be equal to the number of RBs that is used at least to determine the number of bits of the FDRA field.

The number $N^{target}_{RB}$ of RBs of the bandwidth 7006 may be given at least based on some or all of the elements E1 to E5.

For example, in a case that the RNTI for the downlink DCI format is a third prescribed RNTI, the number $N^{target}_{RB}$ of RBs of the bandwidth 7006 may be given at least based on the number $N^{init0}_{RB}$ of RBs of the bandwidth 7002. The third prescribed RNTI may include at least some or all of the SI-RNTI, the RA-RNTI, the TC-RNTI, the P-RNTI, and the C-RNTI.

For example, in a case that the RNTI for the downlink DCI format is a fourth prescribed RNTI, the number $N^{target}_{RB}$ of RBs of the bandwidth 7006 may be given at least based on the number $N^{init1}_{RB}$ of RBs of the bandwidth 7003. The fourth prescribed RNTI may include at least some or all of the SI-RNTI, the RA-RNTI, the TC-RNTI, the P-RNTI, and the C-RNTI. Each of the SI-RNTI, the RA-RNTI, the TC-RNTI, the P-RNTI, and the C-RNTI may be included in only one of the third prescribed RNTI and the fourth prescribed RNTI.

For example, the third prescribed RNTI may include at least the SI-RNTI, and the fourth prescribed RNTI may include at least some or all of the RA-RNTI, the TC-RNTI, the P-RNTI, and the C-RNTI.

For example, the third prescribed RNTI may include at least some or all of the SI-RNTI, the RA-RNTI, the TC-RNTI, and the P-RNTI, and the fourth prescribed RNTI may include at least the C-RNTI.

For example, for a third prescribed search space set for the downlink DCI format, the number $N^{target}_{RB}$ of RBs of the bandwidth 7006 may be given at least based on the number $N^{init0}_{RB}$ of RBs of the bandwidth 7002. The third prescribed search space set may include at least some or all of the type 0 PDCCH common search space, the type 0a PDCCH common search space, the type 1 PDCCH common search space, the type 2 PDCCH common search space, the type 3 PDCCH common search space, and the UE-specific PDCCH search space.

For example, for a fourth prescribed search space set for the downlink DCI format, the number $N^{target}_{RB}$ of RBs of the bandwidth 7006 may be given at least based on the number $N^{init1}_{RB}$ of RBs of the bandwidth 7003. The fourth prescribed search space set may include at least some or all of the type 0 PDCCH common search space, the type 0a PDCCH common search space, the type 1 PDCCH common search space, the type 2 PDCCH common search space, the type 3 PDCCH common search space, and the UE-specific PDCCH search space. Each of the type 0 PDCCH common search space, the type 0a PDCCH common search space, the type 1 PDCCH common search space, the type 2 PDCCH common search space, the type 3 PDCCH common search space, and the UE-specific PDCCH search space may be included in only one of the third prescribed search space set and the fourth prescribed search space set.

The third prescribed search space set may include at least the type 0 PDCCH common search space, and the fourth prescribed search space set may include at least some or all of the type 0a PDCCH common search space, the type 1 PDCCH common search space, the type 2 PDCCH common search space, the type 3 PDCCH common search space, and the UE-specific PDCCH search space.

The third prescribed search space set may include at least one or both of the type 0 PDCCH common search space and the type 0a PDCCH common search space, and the fourth prescribed search space set may include at least some or all of the type 1 PDCCH common search space, the type 2 PDCCH common search space, the type 3 PDCCH common search space, and the UE-specific PDCCH search space.

The third prescribed search space set may include at least some or all of the type 0 PDCCH common search space, the type 0a PDCCH common search space, the type 1 PDCCH common search space, the type 2 PDCCH common search space, and the type 3 PDCCH common search space, and the fourth prescribed search space set may include at least the UE-specific PDCCH search space.

For example, for a third prescribed control resource set associated with the search space set for the downlink DCI format, the number $N^{target}_{RB}$ of RBs of the bandwidth 7006 may be given at least based on the number $N^{init0}_{RB}$ of RBs of the bandwidth 7002. The third prescribed control resource set may include at least some or all of the initial control resource set, the control resource set of the index 0 (CORESET #0), the SIB1 control resource set, and the dedicated control resource set.

For example, for a fourth prescribed control resource set associated with the search space set for the downlink DCI format, the number $N^{target}_{RB}$ of RBs of the bandwidth 7006 may be given at least based on the number $N^{init1}_{RB}$ of RBs of the bandwidth 7003. The fourth prescribed control resource set may include at least some or all of the initial control resource set, the control resource set of the index 0 (CORESET #0), the SIB1 control resource set, and the dedicated control resource set. Each of the initial control resource set, the control resource set of the index 0 (CORESET #0), the SIB1 control resource set, and the dedicated control resource set may be included in only one of the third prescribed control resource set and the fourth prescribed control resource set.

For example, the third prescribed control resource set may include at least some or all of the initial control resource set, the control resource set of the index 0, and the SIB1 control resource set, and the fourth prescribed control resource set may include at least the dedicated control resource set.

For example, the third prescribed control resource set may include at least the initial control resource set, and the fourth prescribed control resource set may include at least some or all of the control resource set of the index 0, the SIB1 control resource set, and the dedicated control resource set.

For example, in a case that the downlink DCI format is a third prescribed downlink DCI format, the number $N^{target}_{RB}$ of RBs of the bandwidth 7006 may be given at least based on the number $N^{init0}_{RB}$ of RBs of the bandwidth 7002. The third prescribed downlink DCI format may include at least one or both of DCI format 1_0 and DCI format 1_1.

For example, in a case that the downlink DCI format is a fourth prescribed downlink DCI format, the number $N^{target}_{RB}$ of RBs of the bandwidth 7006 may be given at least based on the number $N^{init1}_{RB}$ of RBs of the bandwidth 7003. The fourth prescribed downlink DCI format may include at least one or both of DCI format 1_0 and DCI format 1_1. Each of DCI format 1_0 and DCI format 1_1 may be included in only one of the third prescribed downlink DCI format and the fourth prescribed downlink DCI format.

For example, the third prescribed downlink DCI format may include DCI format 1_0, and the fourth prescribed downlink DCI format may include DCI format 1_1.

For example, in a case that the serving cell in which the downlink DCI format is detected is a third prescribed serving cell, the number $N^{target}_{RB}$ of RBs of the bandwidth 7006 may be given at least based on the number $N^{init1}_{RB}$ of RBs of the bandwidth 7002. The third prescribed serving cell may include at least some or all of the PCell, the PSCell, or the SCell.

For example, in a case that the serving cell in which the downlink DCI format is detected is a fourth prescribed serving cell, the number $N^{target}_{RB}$ of RBs of the bandwidth 7006 may be given at least based on the number $N^{init1}_{RB}$ of RBs of the bandwidth 7003. The fourth prescribed serving cell may include at least some or all of the PCell, the PSCell, or the SCell. Each of the PCell, the PSCell, and the SCell may be included in only one of the third prescribed serving cell and the fourth prescribed serving cell.

For example, the third prescribed serving cell may include at least one or both of the PCell and the PSCell, and the fourth prescribed serving cell may include at least the SCell.

The various aspects of the apparatus according to an aspect of the present embodiment may be provided including at least any one of Embodiments B1 to B60 described below. The various aspects of the apparatus according to an aspect of the present embodiment may be provided at least based on a combination of some or all of Embodiments B1 to B60 described below.

The various aspects of the apparatus according to an aspect of the present embodiment may be provided including at least some or all of Embodiments A1 to A60 and Embodiments B1 to B60. The various aspects of the apparatus according to an aspect of the present embodiment may be provided at least based on a combination of some or all of Embodiments A1 to A60 and Embodiments B1 to B60.

In Embodiment B1, in a case that the RNTI for the downlink DCI format is an SI-RNTI and the control resource set associated with the search space set for the downlink DCI format is a common control resource set, the number $N^{target}_{RB}$ of RBs of the bandwidth 7006 is given at least based on the number $N^{init0}_{RB}$ of RBs of the bandwidth 7002.

In Embodiment B2, in a case that the RNTI for the downlink DCI format is an SI-RNTI and the control resource set associated with the search space set for the downlink DCI format is a common control resource set, the number $N^{target}_{RB}$ of RBs of the bandwidth 7006 is given at least based on the number $N^{init0}_{RB}$ of RBs of the bandwidth 7003.

In Embodiment B3, in a case that the RNTI for the downlink DCI format is an SI-RNTI and the control resource set associated with the search space set for the downlink DCI format is a dedicated control resource set, the number $N^{target}_{RB}$ of RBs of the bandwidth 7006 is given at least based on the number $N^{init1}_{RB}$ of RBs of the bandwidth 7002.

In Embodiment B4, in a case that the RNTI for the downlink DCI format is an SI-RNTI and the control resource set associated with the search space set for the downlink DCI format is a dedicated control resource set, the number $N^{target}_{RB}$ of RBs of the bandwidth 7006 is given at least based on the number $N^{init1}_{RB}$ of RBs of the bandwidth 7003.

In Embodiment B5, in a case that the RNTI for the downlink DCI format is a RA-RNTI and the control resource set associated with the search space set for the downlink DCI format is a common control resource set, the number $N^{target}_{RB}$ of RBs of the bandwidth 7006 is given at least based on the number $N^{init0}_{RB}$ of RBs of the bandwidth 7002.

In Embodiment B6, in a case that the RNTI for the downlink DCI format is a RA-RNTI and the control resource set associated with the search space set for the downlink DCI format is a common control resource set, the number $N^{target}_{RB}$ of RBs of the bandwidth 7006 is given at least based on the number $N^{init1}_{RB}$ of RBs of the bandwidth 7003.

In Embodiment B7, in a case that the RNTI for the downlink DCI format is a RA-RNTI and the control resource set associated with the search space set for the downlink DCI format is a dedicated control resource set, the number $N^{target}_{RB}$ of RBs of the bandwidth 7006 is given at least based on the number $N^{init0}_{RB}$ of RBs of the bandwidth 7002.

In Embodiment B8, in a case that the RNTI for the downlink DCI format is a RA-RNTI and the control resource set associated with the search space set for the downlink DCI format is a dedicated control resource set, the number $N^{target}_{RB}$ of RBs of the bandwidth 7006 is given at least based on the number $N^{init1}_{RB}$ of RBs of the bandwidth 7003.

In Embodiment B9, in a case that the RNTI for the downlink DCI format is a TC-RNTI and the control resource set associated with the search space set for the downlink DCI format is a common control resource set, the number $N^{target}_{RB}$ of RBs of the bandwidth 7006 is given at least based on the number $N^{init0}_{RB}$ of RBs of the bandwidth 7002.

In Embodiment B10, in a case that the RNTI for the downlink DCI format is a TC-RNTI and the control resource set associated with the search space set for the downlink DCI format is a common control resource set, the number $N^{target}_{RB}$ of RBs of the bandwidth 7006 is given at least based on the number $N^{init1}_{RB}$ of RBs of the bandwidth 7003.

In Embodiment B11, in a case that the RNTI for the downlink DCI format is a TC-RNTI and the control resource set associated with the search space set for the downlink DCI format is a dedicated control resource set, the number $N^{target}_{RB}$ of RBs of the bandwidth 7006 is given at least based on the number $N^{init0}_{RB}$ of RBs of the bandwidth 7002.

In Embodiment B12, in a case that the RNTI for the downlink DCI format is a TC-RNTI and the control resource set associated with the search space set for the downlink DCI format is a dedicated control resource set, the number $N^{target}_{RB}$ of RBs of the bandwidth 7006 is given at least based on the number $N^{init1}_{RB}$ of RBs of the bandwidth 7003.

In Embodiment B13, in a case that the RNTI for the downlink DCI format is a P-RNTI and the control resource set associated with the search space set for the downlink DCI format is a common control resource set, the number $N^{target}_{RB}$ of RBs of the bandwidth 7006 is given at least based on the number $N^{init0}_{RB}$ of RBs of the bandwidth 7002.

In Embodiment B14, in a case that the RNTI for the downlink DCI format is a P-RNTI and the control resource set associated with the search space set for the downlink DCI format is a common control resource set, the number $N^{target}_{RB}$ of RBs of the bandwidth 7006 is given at least based on the number $N^{init1}_{RB}$ of RBs of the bandwidth 7003.

In Embodiment B15, in a case that the RNTI for the downlink DCI format is a P-RNTI and the control resource set associated with the search space set for the downlink DCI format is a dedicated control resource set, the number $N^{target}_{RB}$ of RBs of the bandwidth 7006 is given at least based on the number $N^{init0}_{RB}$ of RBs of the bandwidth 7002.

In Embodiment B16, in a case that the RNTI for the downlink DCI format is a P-RNTI and the control resource set associated with the search space set for the downlink DCI format is a dedicated control resource set, the number $N^{target}_{RB}$ of RBs of the bandwidth 7006 is given at least based on the number $N^{init1}_{RB}$ of RBs of the bandwidth 7003.

In Embodiment B17, in a case that the RNTI for the downlink DCI format is a C-RNTI, the control resource set associated with the search space set for the downlink DCI format is a common control resource set, and the type of the search space set is a type 0 PDCCH common search space, the number $N^{target}_{RB}$ of RBs of the bandwidth 7006 is given at least based on the number $N^{init0}_{RB}$ of RBs of the bandwidth 7002.

In Embodiment B18, in a case that the RNTI for the downlink DCI format is a C-RNTI, the control resource set associated with the search space set for the downlink DCI format is a common control resource set, and the type of the search space set is a type 0 PDCCH common search space, the number $N^{target}_{RB}$ of RBs of the bandwidth 7006 is given at least based on the number $N^{init1}_{RB}$ of RBs of the bandwidth 7003.

In Embodiment B19, in a case that the RNTI for the downlink DCI format is a C-RNTI, the control resource set associated with the search space set for the downlink DCI format is a common control resource set, and the type of the search space set is a type 0 PDCCH common search space, the number $N^{target}_{RB}$ of RBs of the bandwidth 7006 is given at least based on the number $N^{init2}_{RB}$ of RBs of the bandwidth 7004.

In Embodiment B20, in a case that the RNTI for the downlink DCI format is a C-RNTI, the control resource set associated with the search space set for the downlink DCI format is a common control resource set, and the type of the search space set is a type 0a PDCCH common search space, the number $N^{target}_{RB}$ of RBs of the bandwidth 7006 is given at least based on the number $N^{init0}_{RB}$ of RBs of the bandwidth 7002.

In Embodiment B21, in a case that the RNTI for the downlink DCI format is a C-RNTI, the control resource set associated with the search space set for the downlink DCI format is a common control resource set, and the type of the search space set is a type 0 PDCCH common search space, the number $N^{target}_{RB}$ of RBs of the bandwidth 7006 is given at least based on the number $N^{init1}_{RB}$ of RBs of the bandwidth 7003.

In Embodiment B22, in a case that the RNTI for the downlink DCI format is a C-RNTI, the control resource set associated with the search space set for the downlink DCI format is a common control resource set, and the type of the search space set is a type 0 PDCCH common search space, the number $N^{target}_{RB}$ of RBs of the bandwidth 7006 is given at least based on the number $N^{init2}_{RB}$ of RBs of the bandwidth 7004.

In Embodiment B23, in a case that the RNTI for the downlink DCI format is a C-RNTI, the control resource set associated with the search space set for the downlink DCI format is a common control resource set, and the type of the search space set is a type 1 PDCCH common search space, the number $N^{target}_{RB}$ of RBs of the bandwidth 7006 is given at least based on the number $N^{init0}_{RB}$ of RBs of the bandwidth 7002.

In Embodiment B24, in a case that the RNTI for the downlink DCI format is a C-RNTI, the control resource set associated with the search space set for the downlink DCI format is a common control resource set, and the type of the search space set is a type 1 PDCCH common search space, the number $N^{target}_{RB}$ of RBs of the bandwidth 7006 is given at least based on the number $N^{init1}_{RB}$ of RBs of the bandwidth 7003.

In Embodiment B25, in a case that the RNTI for the downlink DCI format is a C-RNTI, the control resource set associated with the search space set for the downlink DCI format is a common control resource set, and the type of the search space set is a type 1 PDCCH common search space, the number $N^{target}_{RB}$ of RBs of the bandwidth 7006 is given at least based on the number $N^{init2}_{RB}$ of RBs of the bandwidth 7004.

In Embodiment B26, in a case that the RNTI for the downlink DCI format is a C-RNTI, the control resource set associated with the search space set for the downlink DCI format is a common control resource set, and the type of the search space set is a type 2 PDCCH common search space, the number $N^{target}_{RB}$ of RBs of the bandwidth 7006 is given at least based on the number $N^{init0}_{RB}$ of RBs of the bandwidth 7002.

In Embodiment B27, in a case that the RNTI for the downlink DCI format is a C-RNTI, the control resource set associated with the search space set for the downlink DCI format is a common control resource set, and the type of the search space set is a type 2 PDCCH common search space, the number $N^{target}_{RB}$ of RBs of the bandwidth 7006 is given at least based on the number $N^{init1}_{RB}$ of RBs of the bandwidth 7003.

In Embodiment B28, in a case that the RNTI for the downlink DCI format is a C-RNTI, the control resource set associated with the search space set for the downlink DCI format is a common control resource set, and the type of the search space set is a type 2 PDCCH common search space, the number $N^{target}_{RB}$ of RBs of the bandwidth 7006 is given at least based on the number $N^{init2}_{RB}$ of RBs of the bandwidth 7004.

In Embodiment B29, in a case that the RNTI for the downlink DCI format is a C-RNTI, the control resource set associated with the search space set for the downlink DCI format is a common control resource set, and the type of the search space set is a type 3 PDCCH common search space, the number $N^{target}_{RB}$ of RBs of the bandwidth 7006 is given at least based on the number $N^{init0}_{RB}$ of RBs of the bandwidth 7002.

In Embodiment B30, in a case that the RNTI for the downlink DCI format is a C-RNTI, the control resource set associated with the search space set for the downlink DCI format is a common control resource set, and the type of the search space set is a type 3 PDCCH common search space, the number $N^{target}_{RB}$ of RBs of the bandwidth 7006 is given at least based on the number $N^{init1}_{RB}$ of RBs of the bandwidth 7003.

In Embodiment B31, in a case that the RNTI for the downlink DCI format is a C-RNTI, the control resource set associated with the search space set for the downlink DCI format is a common control resource set, and the type of the search space set is a type 3 PDCCH common search space, the number $N^{target}_{RB}$ of RBs of the bandwidth 7006 is given at least based on the number $N^{init2}_{RB}$ of RBs of the bandwidth 7004.

In Embodiment B32, in a case that the RNTI for the downlink DCI format is a C-RNTI, the control resource set associated with the search space set for the downlink DCI format is a common control resource set, and the type of the search space set is a UE-specific PDCCH search space, the number $N^{target}_{RB}$ of RBs of the bandwidth 7006 is given at least based on the number $N^{init1}_{RB}$ of RBs of the bandwidth 7002.

In Embodiment B33, in a case that the RNTI for the downlink DCI format is a C-RNTI, the control resource set associated with the search space set for the downlink DCI format is a common control resource set, and the type of the search space set is a UE-specific PDCCH search space, the number $N^{target}_{RB}$ of RBs of the bandwidth 7006 is given at least based on the number $N^{init1}_{RB}$ of RBs of the bandwidth 7003.

In Embodiment B34, in a case that the RNTI for the downlink DCI format is a C-RNTI, the control resource set associated with the search space set for the downlink DCI format is a common control resource set, and the type of the search space set is a UE-specific PDCCH search space, the number $N^{target}_{RB}$ of RBs of the bandwidth 7006 is given at least based on the number $N^{init2}_{RB}$ of RBs of the bandwidth 7004.

In Embodiment B35, in a case that the RNTI for the downlink DCI format is a C-RNTI, the control resource set associated with the search space set for the downlink DCI format is a dedicated control resource set, and the type of the search space set is a type 0 PDCCH common search space, the number $N^{target}_{RB}$ of RBs of the bandwidth 7006 is given at least based on the number $N^{init1}_{RB}$ of RBs of the bandwidth 7002.

In Embodiment B36, in a case that the RNTI for the downlink DCI format is a C-RNTI, the control resource set associated with the search space set for the downlink DCI format is a dedicated control resource set, and the type of the search space set is a type 0 PDCCH common search space, the number $N^{target}_{RB}$ of RBs of the bandwidth 7006 is given at least based on the number $N^{init1}_{RB}$ of RBs of the bandwidth 7003.

In Embodiment B37, in a case that the RNTI for the downlink DCI format is a C-RNTI, the control resource set associated with the search space set for the downlink DCI format is a dedicated control resource set, and the type of the search space set is a type 0 PDCCH common search space, the number $N^{target}_{RB}$ of RBs of the bandwidth 7006 is given at least based on the number $N^{init2}_{RB}$ of RBs of the bandwidth 7004.

In Embodiment B38, in a case that the RNTI for the downlink DCI format is a C-RNTI, the control resource set associated with the search space set for the downlink DCI format is a dedicated control resource set, and the type of the search space set is a type 0a PDCCH common search space, the number $N^{target}_{RB}$ of RBs of the bandwidth 7006 is given at least based on the number $N^{init1}_{RB}$ of RBs of the bandwidth 7002.

In Embodiment B39, in a case that the RNTI for the downlink DCI format is a C-RNTI, the control resource set associated with the search space set for the downlink DCI format is a dedicated control resource set, and the type of the search space set is a type 0a PDCCH common search space, the number $N^{target}_{RB}$ of RBs of the bandwidth 7006 is given at least based on the number $N^{init1}_{RB}$ of RBs of the bandwidth 7003.

In Embodiment B40, in a case that the RNTI for the downlink DCI format is a C-RNTI, the control resource set associated with the search space set for the downlink DCI format is a dedicated control resource set, and the type of the search space set is a type 0a PDCCH common search space, the number $N^{target}_{RB}$ of RBs of the bandwidth 7006 is given at least based on the number $N^{init2}_{RB}$ of RBs of the bandwidth 7004.

In Embodiment B41, in a case that the RNTI for the downlink DCI format is a C-RNTI, the control resource set associated with the search space set for the downlink DCI format is a dedicated control resource set, and the type of the search space set is a type 1 PDCCH common search space, the number $N^{target}_{RB}$ of RBs of the bandwidth 7006 is given at least based on the number $N^{init1}_{RB}$ of RBs of the bandwidth 7002.

In Embodiment B42, in a case that the RNTI for the downlink DCI format is a C-RNTI, the control resource set associated with the search space set for the downlink DCI format is a dedicated control resource set, and the type of the search space set is a type 1 PDCCH common search space, the number $N^{target}_{RB}$ of RBs of the bandwidth 7006 is given at least based on the number $N^{init1}_{RB}$ of RBs of the bandwidth 7003.

In Embodiment B43, in a case that the RNTI for the downlink DCI format is a C-RNTI, the control resource set associated with the search space set for the downlink DCI format is a dedicated control resource set, and the type of the search space set is a type 1 PDCCH common search space, the number $N^{target}_{RB}$ of RBs of the bandwidth 7006 is given at least based on the number $N^{init2}_{RB}$ of RBs of the bandwidth 7004.

In Embodiment B44, in a case that the RNTI for the downlink DCI format is a C-RNTI, the control resource set associated with the search space set for the downlink DCI format is a dedicated control resource set, and the type of the search space set is a type 2 PDCCH common search space, the number $N^{target}_{RB}$ of RBs of the bandwidth 7006 is given at least based on the number $N^{init1}_{RB}$ of RBs of the bandwidth 7002.

In Embodiment B45, in a case that the RNTI for the downlink DCI format is a C-RNTI, the control resource set associated with the search space set for the downlink DCI format is a dedicated control resource set, and the type of the search space set is a type 2 PDCCH common search space, the number $N^{target}_{RB}$ of RBs of the bandwidth 7006 is given at least based on the number $N^{inti1}_{RB}$ of RBs of the bandwidth 7003.

In Embodiment B46, in a case that the RNTI for the downlink DCI format is a C-RNTI, the control resource set associated with the search space set for the downlink DCI format is a dedicated control resource set, and the type of the search space set is a type 2 PDCCH common search space, the number $N^{target}_{RB}$ of RBs of the bandwidth 7006 is given at least based on the number $N^{init2}_{RB}$ of RBs of the bandwidth 7004.

In Embodiment B47, in a case that the RNTI for the downlink DCI format is a C-RNTI, the control resource set associated with the search space set for the downlink DCI format is a dedicated control resource set, and the type of the search space set is a type 3 PDCCH common search space, the number $N^{target}_{RB}$ of RBs of the bandwidth 7006 is given at least based on the number $N^{init0}_{RB}$ of RBs of the bandwidth 7002.

In Embodiment B48, in a case that the RNTI for the downlink DCI format is a C-RNTI, the control resource set associated with the search space set for the downlink DCI format is a dedicated control resource set, and the type of the search space set is a type 3 PDCCH common search space, the number $N^{target}_{RB}$ of RBs of the bandwidth 7006 is given at least based on the number $N^{init1}_{RB}$ of RBs of the bandwidth 7003.

In Embodiment B49, in a case that the RNTI for the downlink DCI format is a C-RNTI, the control resource set associated with the search space set for the downlink DCI format is a dedicated control resource set, and the type of the search space set is a type 3 PDCCH common search space, the number $N^{target}_{RB}$ of RBs of the bandwidth 7006 is given at least based on the number $N^{init2}_{RB}$ of RBs of the bandwidth 7004.

In Embodiment B50, in a case that the RNTI for the downlink DCI format is a C-RNTI, the control resource set associated with the search space set for the downlink DCI format is a dedicated control resource set, and the type of the search space set is a UE-specific PDCCH search space, the number $N^{target}_{RB}$ of RBs of the bandwidth 7006 is given at least based on the number $N^{init0}_{RB}$ of RBs of the bandwidth 7002.

In Embodiment B51, in a case that the RNTI for the downlink DCI format is a C-RNTI, the control resource set associated with the search space set for the downlink DCI format is a dedicated control resource set, and the type of the search space set is a UE-specific PDCCH search space, the number $N^{target}_{RB}$ of RBs of the bandwidth 7006 is given at least based on the number $N^{init1}_{RB}$ of RBs of the bandwidth 7003.

In Embodiment B52, in a case that the RNTI for the downlink DCI format is a C-RNTI, the control resource set associated with the search space set for the downlink DCI format is a dedicated control resource set, and the type of the search space set is a UE-specific PDCCH search space, the number $N^{target}_{RB}$ of RBs of the bandwidth 7006 is given at least based on the number $N^{init2}_{RB}$ of RBs of the bandwidth 7004.

In Embodiment B53, in a case that the RNTI for the downlink DCI format is a C-RNTI, the control resource set associated with the search space set for the downlink DCI format is a common control resource set, the type of the search space set is a UE-specific PDCCH search space, the downlink DCI format is DCI format 1_0, and the condition 101 for the DCI size is not satisfied in a slot in which the downlink DCI format is monitored, the number $N^{target}_{RB}$ of RBs of the bandwidth 7006 is given at least based on the number $N^{init0}_{RB}$ of RBs of the bandwidth 7002.

In Embodiment B54, in a case that the RNTI for the downlink DCI format is a C-RNTI, the control resource set associated with the search space set for the downlink DCI format is a common control resource set, the type of the search space set is a UE-specific PDCCH search space, the downlink DCI format is DCI format 1_0, and the condition 101 for the DCI size is not satisfied in a slot in which the downlink DCI format is monitored, the number $N^{target}_{RB}$ of RBs of the bandwidth 7006 is given at least based on the number $N^{init1}_{RB}$ of RBs of the bandwidth 7003.

In Embodiment B55, in a case that the RNTI for the downlink DCI format is a C-RNTI, the control resource set associated with the search space set for the downlink DCI format is a common control resource set, the type of the search space set is a UE-specific PDCCH search space, the downlink DCI format is DCI format 1_0, and the condition 101 for the DCI size is satisfied in a slot in which the downlink DCI format is monitored, the number $N^{target}_{RB}$ of RBs of the bandwidth 7006 is given at least based on the number $N^{init2}_{RB}$ of RBs of the bandwidth 7004.

In Embodiment B56, in a case that the RNTI for the downlink DCI format is a C-RNTI, the control resource set associated with the search space set for the downlink DCI format is a common control resource set, the type of the search space set is a UE-specific PDCCH search space, and the downlink DCI format is DCI format 1_1, the number $N^{target}_{RB}$ of RBs of the bandwidth 7006 is given at least based on the number $N^{init2}_{RB}$ of RBs of the bandwidth 7004.

In Embodiment B57, in a case that the RNTI for the downlink DCI format is a C-RNTI, the control resource set associated with the search space set for the downlink DCI format is a dedicated control resource set, the type of the search space set is a UE-specific PDCCH search space, the downlink DCI format is DCI format 1_0, and the condition 101 for the DCI size is not satisfied in a slot in which the downlink DCI format is monitored, the number $N^{target}_{RB}$ of RBs of the bandwidth 7006 is given at least based on the number $N^{init0}_{RB}$ of RBs of the bandwidth 7002.

In Embodiment B58, in a case that the RNTI for the downlink DCI format is a C-RNTI, the control resource set associated with the search space set for the downlink DCI format is a dedicated control resource set, the type of the search space set is a UE-specific PDCCH search space, the downlink DCI format is DCI format 1_0, and the condition 101 for the DCI size is not satisfied in a slot in which the downlink DCI format is monitored, the number $N^{target}_{RB}$ of RBs of the bandwidth 7006 is given at least based on the number $N^{init1}_{RB}$ of RBs of the bandwidth 7003.

In Embodiment B59, in a case that the RNTI for the downlink DCI format is a C-RNTI, the control resource set associated with the search space set for the downlink DCI format is a dedicated control resource set, the type of the search space set is a UE-specific PDCCH search space, the downlink DCI format is DCI format 1_0, and the condition 101 for the DCI size is satisfied in a slot in which the downlink DCI format is monitored, the number $N^{target}_{RB}$ of RBs of the bandwidth 7006 is given at least based on the number $N^{init2}_{RB}$ of RBs of the bandwidth 7004.

In Embodiment B60, in a case that the RNTI for the downlink DCI format is a C-RNTI, the control resource set associated with the search space set for the downlink DCI format is a dedicated control resource set, the type of the search space set is a UE-specific PDCCH search space, and the downlink DCI format is DCI format 1_1, the number $N^{target}_{RB}$ of RBs of the bandwidth 7006 is given at least based on the number $N^{init2}_{RB}$ of RBs of the bandwidth 7004.

Padding or truncation of bits may be performed such that the number $N^{DCI}_{bit2}$ of bits for downlink DCI format 2 is equal to the number $N^{DCI}_{bit}$ of bits for DCI format 1_0. DCI format 1_0 may include a FDRA field in which the number of bits is given at least based on the number of resource blocks of the bandwidth 7002. DCI format 1_0 may include a FDRA field in which the number of bits is given at least based on the number of resource blocks of the bandwidth 7003.

The number of resource blocks of a first bandwidth being given at least based on the number of resource blocks of a second bandwidth may be the number of resource blocks of the first bandwidth being equal to the number of resource blocks of the second bandwidth.

The various aspects of the apparatus according to an aspect of the present embodiment will be described below.

(1) To accomplish the object described above, the aspects of the present invention are contrived to provide the following measures. Specifically, an aspect of the present invention is a terminal apparatus including a receiver configured to monitor a PDCCH and receive a PDSCH scheduled at least based on a downlink DCI format included in the PDCCH, and a transmitter configured to transmit a HARQ-ACK corresponding to the PDSCH on a PUCCH, wherein the number of bits of a frequency domain resource assignment field included in the downlink DCI format is given based on a RNTI used for scrambling CRC bits added to the downlink DCI format.

(2) An aspect of the present invention is a terminal apparatus including a receiver configured to monitor a PDCCH and receive a PDSCH scheduled at least based on a downlink DCI format included in the PDCCH, and a transmitter configured to transmit a HARQ-ACK corresponding to the PDSCH on a PUCCH, wherein the number of bits of a frequency domain resource assignment field included in the downlink DCI format is given at least based on the number of resource blocks in an initial downlink BWP, the PDSCH is mapped to an active downlink BWP, the number of resource blocks in the initial downlink BWP is given at least based on a higher layer parameter included in a MIB, and the number of resource blocks in the active downlink BWP is given at least based on a higher layer parameter included in an SIB.

(3) An aspect of the present invention is a base station apparatus including a transmitter configured to transmit a PDCCH and transmit a PDSCH scheduled at least based on a downlink DCI format included in the PDCCH, and a receiver configured to receive a HARQ-ACK corresponding to the PDSCH on a PUCCH, wherein the number of bits of a frequency domain resource assignment field included in the downlink DCI format is given based on a RNTI used for scrambling CRC bits added to the downlink DCI format.

(4) An aspect of the present invention is a base station apparatus including a transmitter configured to transmit a PDCCH and transmit a PDSCH scheduled at least based on a downlink DCI format included in the PDCCH, and a receiver configured to receive a HARQ-ACK corresponding to the PDSCH on a PUCCH, wherein the number of bits of a frequency domain resource assignment field included in the downlink DCI format is given at least based on the number of resource blocks in an initial downlink BWP, the PDSCH is mapped to an active downlink BWP, the number of resource blocks in the initial downlink BWP is given at least based on a higher layer parameter included in a MIB, and the number of resource blocks in the active downlink BWP is given at least based on a higher layer parameter included in an SIB.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be one for realizing some of the above-described functions, and also may be one capable of realizing the above-described functions in combination with a program already recorded in a computer system.

Furthermore, the base station apparatus 3 according to the above-described embodiment may be achieved as an aggregation (apparatus group) including multiple apparatuses. Each of the apparatuses comprising such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 1 according to the above-described embodiment can also communicate with the base station apparatus as the aggregation.

Moreover, the base station apparatus 3 according to the above-described embodiment may be the Evolved Universal Terrestrial Radio Access Network (EUTRAN) and/or the NextGen RAN, NR RAN (NG-RAN). Moreover, the base station apparatus 3 according to the above-described embodiment may have some or all of the functions of a higher node for an eNodeB and/or a gNB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit,
15, 35 Medium access control layer processing unit
16, 36 Radio resource control layer processing unit
7001 Carrier
7002, 7003, 7004, 7005, 7006 Bandwidth

The invention claimed is:

1. A terminal apparatus comprising:
a receiver configured to monitor a Physical Downlink Control CHannel (PDCCH) with a Downlink Control Information (DCI) format in a control resource set, and receive a Physical Downlink Shared CHannel (PDSCH) scheduled by the DCI format, wherein the DCI format includes a frequency domain resource assignment field, in a case that a number of bits of the frequency domain resource assignment field is given at least based on a number of resource blocks ($N^{target}_{RB}$) of a first bandwidth, and the frequency domain resource assignment field applies to the first bandwidth, a value $N_{RIV}$ indicated by the frequency domain resource assignment field is given based on a first method, in a case that a number of bits of the frequency domain resource assignment field is given at least based on a number of resource blocks ($N^{size}_{RB}$) of a second bandwidth which is different from the first bandwidth, and the frequency domain resource assignment field applies to the first bandwidth, the value $N_{RIV}$ is given based on a second method which is different from the first method, in the first method, the $N_{RIV}$ is equal to $N^{target}_{RB} * (L_{RBs}-1)+RB_{start}$ if $L_{RBs}-1$ is smaller than or equal to floor($N^{target}_{RB}/2$), and the $N_{RIV}$ is equal to $N^{target}_{RB} * (N^{target}_{RB}-L_{RBs}+1)+N^{target}_{RB}-1-RB_{start}$, if $L_{RBs}-1$ is larger than floor($N^{target}_{RB}/2$), where the floor($N^{target}_{RB}/2$) is a largest integer within a range that does not exceed the $N^{target}_{RB}/2$, the $N^{target}_{RB}$ is a number of resource blocks to which the frequency domain resource assignment field applies, the $RB_{start}$ is an starting index for resource block(s) on which the PDSCH is mapped, and $L_{RBs}$ is a number of the resource block(s) on which the PDSCH is mapped, in the second method, the $N_{RIV}$ is equal to $N^{size}_{RB} * (L^2_{RBs}-1)+RB^2_{start}$, if $L^2_{RBs}-1$ is smaller than or equal to floor($N^{size}_{RB}/2$), and the $N_{RIV}$ is equal to $N^{size}_{RB} *$ $(N^{size}_{RB}-L^2_{RBs}+1)+N^{size}_{RB}-1-RB^2_{start}$, if $L^2_{RBs}-1$ is larger than floor($N^{size}_{RB}/2$), where the floor($N^{size}_{RB}/2$) is a largest integer within a range that does not exceed the $N^{size}_{RB}/2$, the $RB^2_{start}$ is given by the $RB_{start}$ divided by K, and the $L^2_{RBs}$ is given by $L_{RBs}$ divided by the K, in the second method, in a case that $N^{target}_{RB} > N^{size}_{RB}$ is satisfied, the K is the maximum value among 1, 2, 4 and 8 under a condition satisfying k≤floor($N^{target}_{RB}/N^{size}_{RB}$), and in the second method, in a case that $N^{target}_{RB} > N^{size}_{RB}$ is not satisfied, the K is equal to 1.

2. A base station apparatus comprising:

a transmitter configured to transmit a Physical Downlink Control CHannel (PDCCH) with a Downlink Control Information (DCI) format in a control resource set, and transmit a Physical Downlink Shared CHannel (PDSCH) scheduled by the DCI format, wherein the DCI format includes a frequency domain resource assignment field, in a case that a number of bits of the frequency domain resource assignment field is given at least based on a number of resource blocks ($N^{target}_{RB}$) of a first bandwidth, and the frequency domain resource assignment field applies to the first bandwidth, a value $N_{RIV}$ indicated by the frequency domain resource assignment field is given based on a first method, in a case that a number of bits of the frequency domain resource assignment field is given at least based on a number of resource blocks ($N^{size}_{RB}$) of a second bandwidth which is different from the first bandwidth, and the frequency domain resource assignment field applies to the first bandwidth, the value $N_{RIV}$ is given based on a second method which is different from the first method, in the first method, the $N_{RIV}$ is equal to $N^{target}_{RB}*(L_{RBs}-1)+RB_{start}$ if $L_{RBs}-1$ is smaller than or equal to floor ($N^{target}_{RB}/2$), and the $N_{RIV}$ is equal to $N^{target}_{RB}*(N^{target}_{RB}-L_{RBs}+1)+N^{target}_{RB}-1-RB_{start}$, if $L_{RBs}-1$ is larger than floor($N^{target}_{RB}/2$), where the floor($N^{target}_{RB}/2$) is a largest integer within a range that does not exceed the $N^{target}_{RB}/2$, the $N^{target}_{RB}$ is a number of resource blocks to which the frequency domain resource assignment field applies, the $RB_{start}$ is an starting index for resource block(s) on which the PDSCH is mapped, and $L_{RBs}$ is a number of the resource block(s) on which the PDSCH is mapped, in the second method, the $N_{RIV}$ is equal to $N^{size}_{RB}*(L^2_{RBs}-1)+RB^2_{start}$, if $L^2_{RBs}-1$ is smaller than or equal to floor($N^{size}_{RB}/2$), and the $N_{RIV}$ is equal to $N^{size}_{RB}*(N^{size}_{RB}-L^2_{RBs}+1)+N^{size}_{RB}-1-RB^2_{start}$, if $L^2_{RBs}-1$ is larger than floor($N^{size}_{RB}/2$), where the floor($N^{size}_{RB}/2$) is a largest integer within a range that does not exceed the $N^{size}_{RB}/2$, the $RB^2_{start}$ is given by the $RB_{start}$ divided by K, and the $L^2_{RBs}$ is given by $L_{RBs}$ divided by the K, in the second method, in a case that $N^{target}_{RB} > N^{size}_{RB}$ is satisfied, the K is the maximum value among 1, 2, 4, and 8 under a condition satisfying K floor($N^{target}_{RB}/N^{size}_{RB}$), and in the second method, in a case that $N^{target}_{RB} > N^{size}_{RB}$ is not satisfied, the K is equal to 1.

3. A communication method used for a terminal apparatus, the communication method comprising:

monitoring a Physical Downlink Control CHannel (PDCCH) with a Downlink Control Information (DCI) format in a control resource set; and receiving a Physical Downlink Shared CHannel (PDSCH) scheduled by the DCI format, wherein the DCI format includes a frequency domain resource assignment field, in a case that a number of bits of the frequency domain resource assignment field is given at least based on a number of resource blocks ($N^{target}_{RB}$) of a first bandwidth, and the frequency domain resource assignment field applies to the first bandwidth, a value $N_{RIV}$ indicated by the frequency domain resource assignment field is given based on a first method, in a case that a number of bits of the frequency domain resource assignment field is given at least based on a number of resource blocks ($N^{size}_{RB}$) of a second bandwidth which is different from the first bandwidth, and the frequency domain resource assignment field applies to the first bandwidth, the value $N_{RIV}$ is given based on a second method which is different from the first method, in the first method, the $N_{RIV}$ is equal to $N^{target}_{RB}*(L_{RBs}-1)+RB_{start}$ in response to $L_{RBs}-1$ being smaller than or equal to floor($N^{target}_{RB}/2$), and the $N_{RIV}$ is equal to $N^{target}_{RB}*(N^{target}_{RB}-L_{RBs}+1)+N^{target}_{RB}-1-RB_{start}$, in response to $L_{RBs}-1$ being larger than floor($N^{target}_{RB}/2$), where the floor($N^{target}_{RB}/2$) is a largest integer within a range that does not exceed the $N^{target}_{RB}/2$, the $N^{target}_{RB}$ is a number of resource blocks to which the frequency domain resource assignment field applies, the $RB_{start}$ is an starting index for resource block(s) on which the PDSCH is mapped, and $L_{RBs}$ is a number of the resource block(s) on which the PDSCH is mapped, in the second method, the $N_{RIV}$ is equal to $N^{size}_{RB}*(L^2_{RBs}-1)+RB^2_{start}$, in response to $L^2_{RBs}-1$ being smaller than or equal to floor($N^{size}_{RB}/2$), and the $N_{RIV}$ is equal to $N^{size}_{RB}*(N^{size}_{RB}-L^2_{RBs}+1)+N^{size}_{RB}-1-RB^2_{start}$, in response to $L^2_{RBs}-1$ being larger than floor($N^{size}_{RB}/2$), where the floor($N^{size}_{RB}/2$) is a largest integer within a range that does not exceed the $N^{size}_{RB}/2$, the $RB^2_{start}$ is given by the $RB_{start}$ divided by K, and the $L^2_{RBs}$ is given by $L_{RBs}$ divided by the K, in the second method, in a case that $N^{target}_{RB} > N^{size}_{RB}$ is satisfied, the K is the maximum value among 1, 2, 4, and 8 under a condition satisfying K floor($N^{target}_{RB}/N^{size}_{RB}$), and in the second method, in a case that $N^{target}_{RB} > N^{size}_{RB}$ is not satisfied, the K is equal to 1.

4. A communication method used for a base station apparatus, the communication method comprising:

transmitting a Physical Downlink Control CHannel (PDCCH) with a Downlink Control Information (DCI) format in a control resource set; and transmitting a Physical Downlink Shared CHannel (PDSCH) scheduled by the DCI format, wherein the DCI format includes a frequency domain resource assignment field, in a case that a number of bits of the frequency domain resource assignment field is given at least based on a number of resource blocks ($N^{target}_{RB}$) of a first bandwidth, and the frequency domain resource assignment field applies to the first bandwidth, a value $N_{RIV}$ indicated by the frequency domain resource assignment field is given based on a first method, in a case that a number of bits of the frequency domain resource assignment field is given at least based on a number of resource blocks ($N^{size}_{RB}$) of a second bandwidth which is different from the first bandwidth, and the frequency domain resource assignment field applies to the first bandwidth, the value $N_{RIV}$ is given based on a second method which is different from the first method, in the first method, the $N_{RIV}$ is equal to $N^{target}_{RB}*(L_{RBs}-1)+RB_{start}$ in response to $L_{RBs}-1$ being smaller than or equal to $floor(N^{target}_{RB}/2)$, and the $N_{RIV}$ is equal to $N^{target}_{RB}*(N^{target}_{RB}-L_{RBs}+1)+N^{target}_{RB}-1-RB_{start}$, in response to $L_{RBs}-1$ being larger than $floor(N^{target}_{RB}/2)$, where the $floor(N^{target}_{RB}/2)$ is a largest integer within a range that does not exceed the $N^{target}_{RB}/2$, the $N^{target}_{RB}$ is a number of resource blocks to which the frequency domain resource assignment field applies, the $RB_{start}$ is an starting index for resource block(s) on which the PDSCH is mapped, and $L_{RBs}$ is a number of the resource block(s) on which the PDSCH is mapped, in the second method, the $N_{RIV}$ is equal to $N^{size}_{RB}*(L^2_{RBs}-1)+RB^2_{start}$, in response to $L^2_{RBs}-1$ being smaller than or equal to $floor(N^{size}_{RB}/2)$, and the $N_{RIV}$ is equal to $N^{size}_{RB}*(N^{size}_{RB}-L^2_{RBs}+1)+N^{size}_{RB}-1-RB^2_{start}$, in response to $L^2_{RBs}-1$ being larger than $floor(N^{size}_{RB}/2)$, where the $floor(N^{size}_{RB}/2)$ is a largest integer within a range that does not exceed the $N^{size}_{RB}/2$, the $RB^2_{start}$ is given by the $RB_{start}$ divided by K, and the $L^2_{RBs}$ is given by $L_{RBs}$ divided by the K, in the second method, in a case that $N^{target}_{RB}>N^{size}_{RB}$ is satisfied, the K is the maximum value among 1, 2, 4, and 8 under a condition satisfying K $floor(N^{target}_{RB}/N^{size}_{RB})$, and in the second method, in a case that $N^{target}R_B>N^{size}_{RB}$ is not satisfied, the K is equal to 1.

* * * * *